July 31, 1951  F. CAMPOS  2,562,172
CALCULATING MACHINE
Filed Feb. 28, 1945  15 Sheets-Sheet 1

Inventor
FRANCISCO CAMPOS,
By Allen & Allen
Attorneys.

July 31, 1951  F. CAMPOS  2,562,172
CALCULATING MACHINE
Filed Feb. 28, 1945  15 Sheets-Sheet 2

Inventor
FRANCISCO CAMPOS,
By
Allen & Allen
Attorneys.

Inventor
FRANCISCO CAMPOS,

July 31, 1951 F. CAMPOS 2,562,172
CALCULATING MACHINE
Filed Feb. 28, 1945 15 Sheets-Sheet 7

Francisco Campos
Inventor
By Allen & Allen
Attorneys

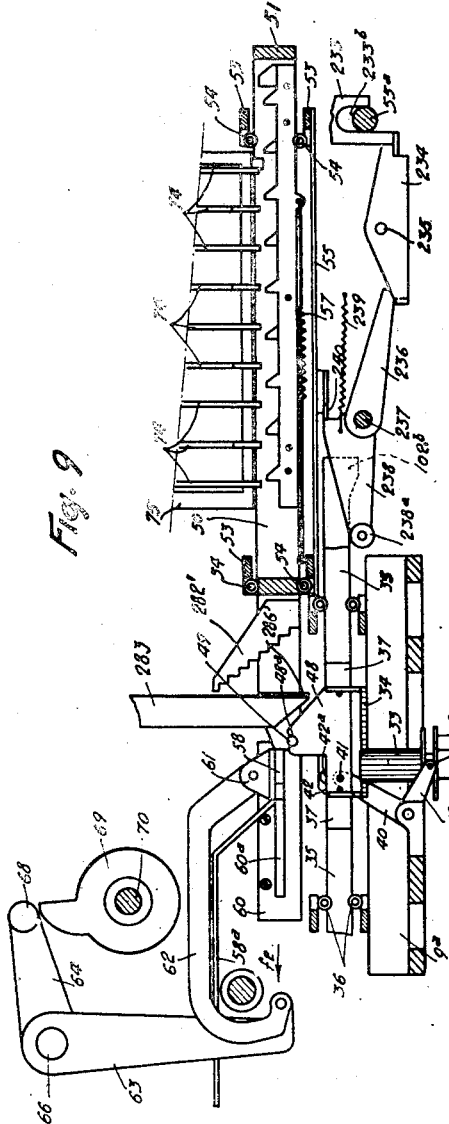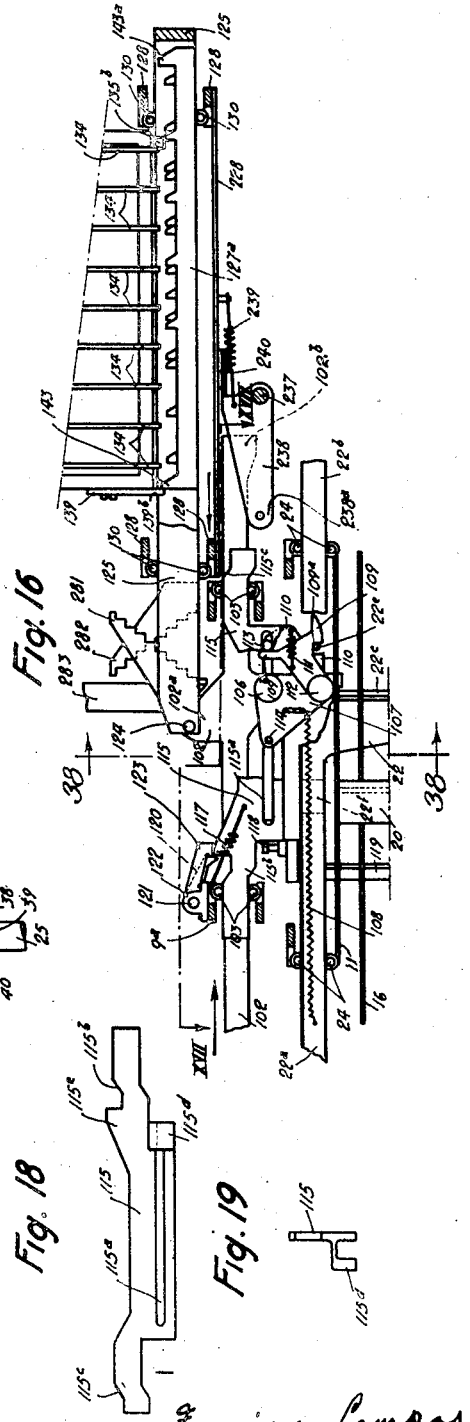

July 31, 1951 F. CAMPOS 2,562,172
CALCULATING MACHINE
Filed Feb. 28, 1945 15 Sheets-Sheet 9

Francisco Campos
Inventor
By Allen & Allen
Attorneys

July 31, 1951  F. CAMPOS  2,562,172
CALCULATING MACHINE
Filed Feb. 28, 1945  15 Sheets-Sheet 10

July 31, 1951  F. CAMPOS  2,562,172
CALCULATING MACHINE
Filed Feb. 28, 1945  15 Sheets-Sheet 11
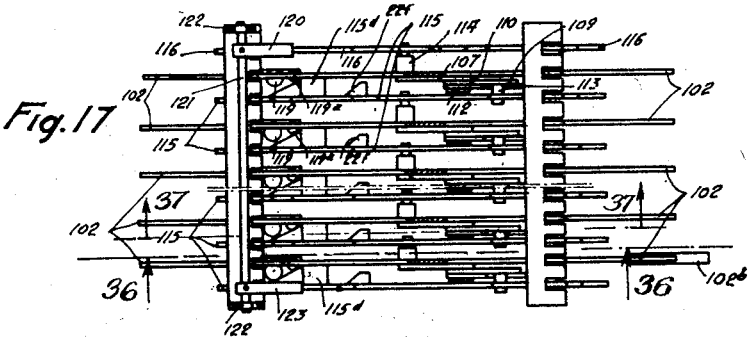
Fig. 17
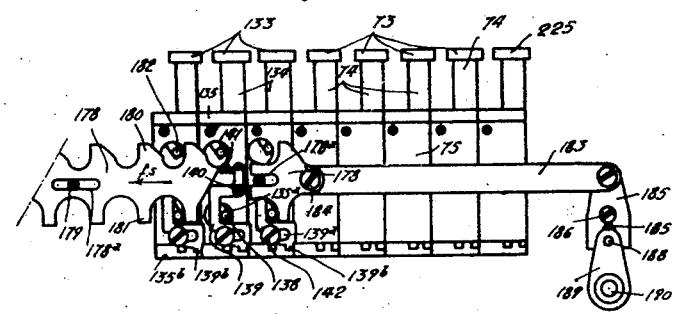
Fig. 22
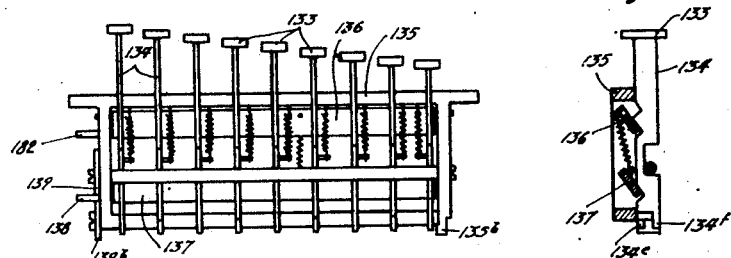
Fig. 23
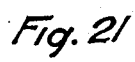
Fig. 24
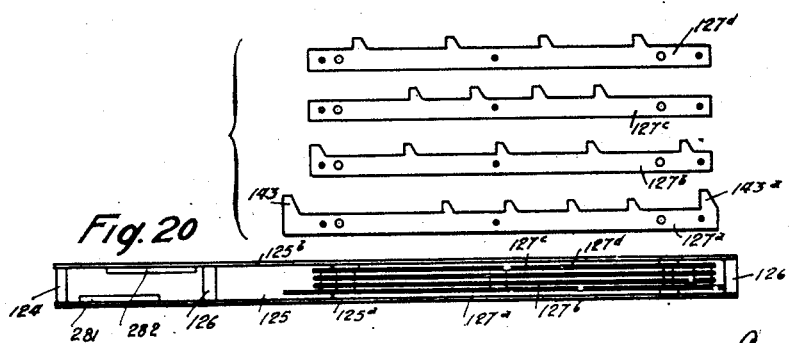
Fig. 21
Fig. 20
Francisco Campos
Inventor
By Allen & Allen
Attorneys

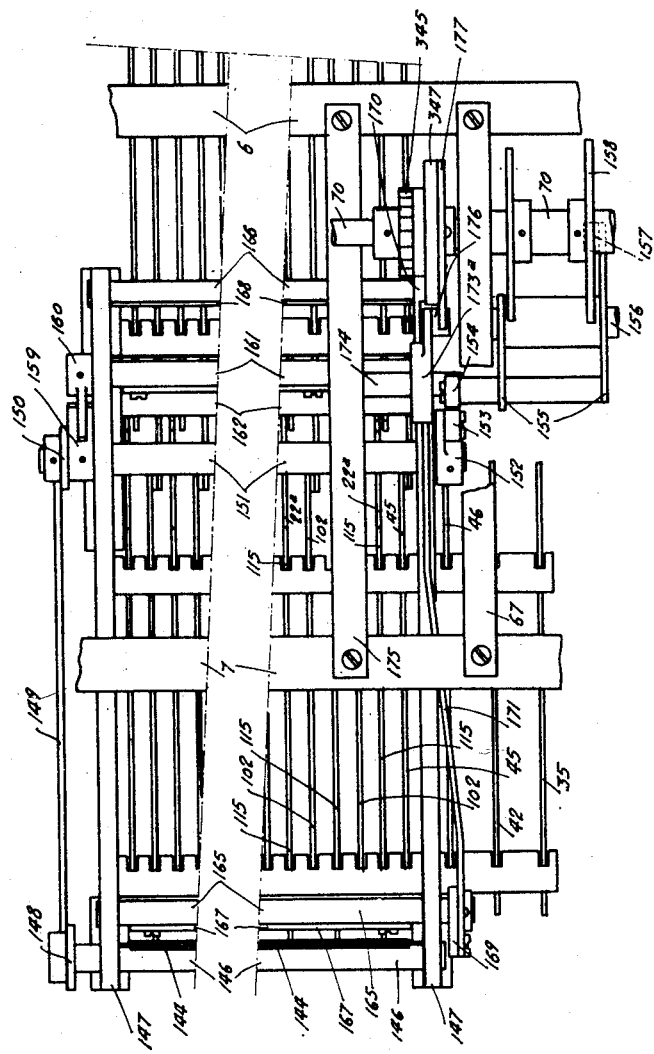

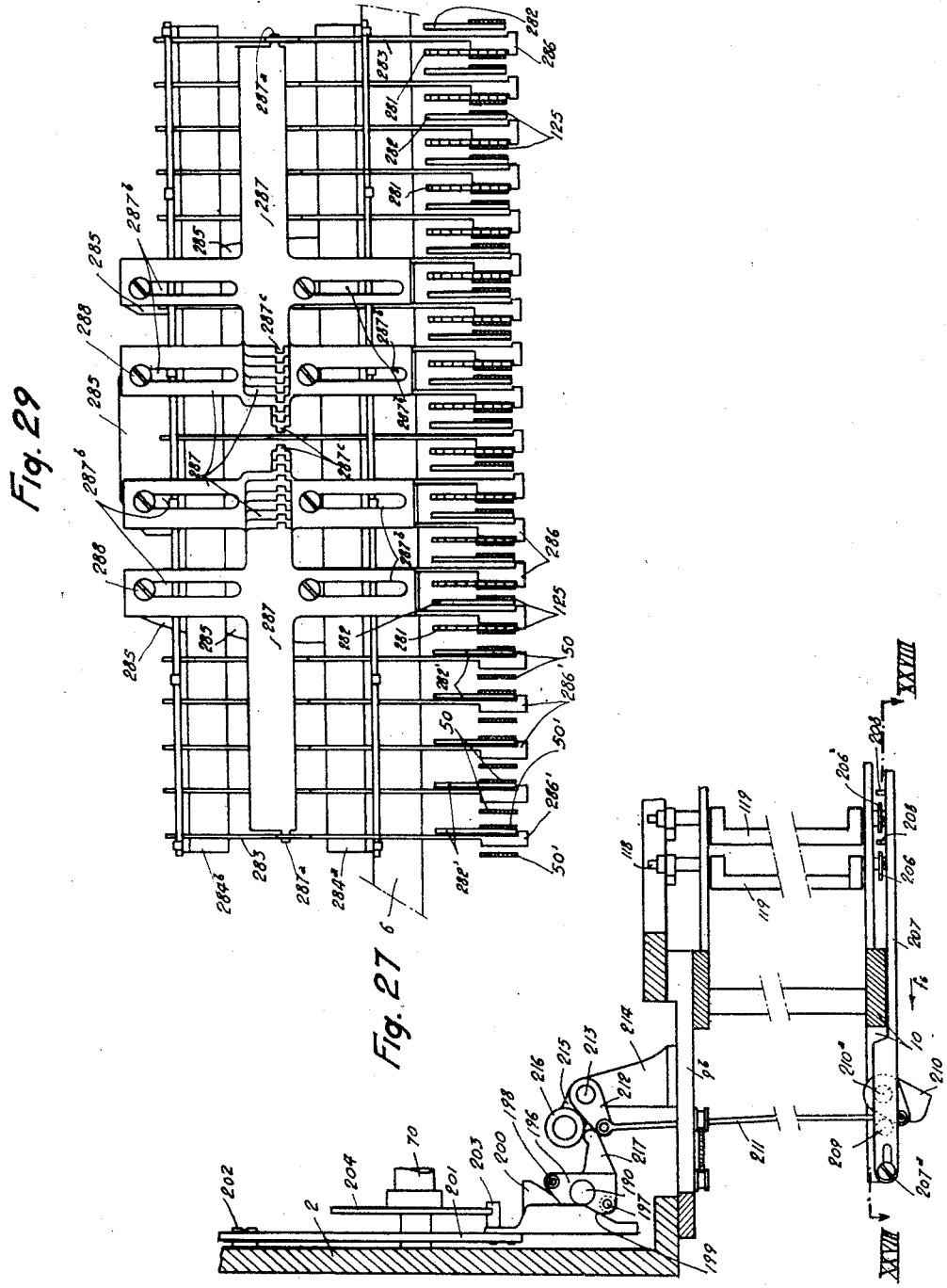

July 31, 1951 F. CAMPOS 2,562,172
CALCULATING MACHINE
Filed Feb. 28, 1945 15 Sheets-Sheet 14

Francisco Campos
Inventor
By Allen & Allen
Attorneys

July 31, 1951  F. CAMPOS  2,562,172
CALCULATING MACHINE
Filed Feb. 28, 1945  15 Sheets-Sheet 15

Inventor.
FRANCISCO CAMPOS,
By Allen & Allen
Attorneys.

Patented July 31, 1951

2,562,172

UNITED STATES PATENT OFFICE 2,562,172

CALCULATING MACHINE

Francisco Campos, Paris, France, assignor to Societe Civile des Brevets Logabax, Paris, France, a corporation of France Application February 28, 1945, Serial No. 580,194
In France August 18, 1941

Sections 3 and 1, Public Law 690, August 8, 1946
Patent expires August 18, 1961

9 Claims. (Cl. 235—60)

Book-keeping and statistics require nowadays machines which are capable of accumulating and grouping sums and/or balances under more and more numerous heads. The hitherto used adding machines, which are equipped with numerous counting units, do not still comprise a number of counting units answering the needs of many users. On the other hand, machines which are equipped with multiple recorders instead of counting units are well known, but the sums retained in these recorders must be transferred during each operation to an adding device forming part of the machine in order to add another sum thereto, after which the result of this addition must be transferred anew into the recorder. Statistical machines which are built according to the system of perforated cards can also be found; they require numerous punching, sorting and tabulating operations before they can give results adapted to be definitively employed.

Furthermore, in a general manner, these three kinds of known machines: adding machines with numerous counting units, machines with multiple recorders and statistical machines require too much considerable space and their high cost of manufacture and high selling price are such that only large business concerns are able to acquire them.

One object of the present invention is to provide a calculating machine with a plurality of account units, which machine is capable of adding algebraically, that is, having regard to the sign so as to obtain positive or negative balances as the case may be.

Another object of the invention is to provide such a machine in which it is possible to group in a plurality of interconnected sections of the machine various elements of the calculation or various results set up or obtained in the various account units.

It is another object of the invention to provide such a machine which is of relatively simple construction and small bulk, and which obviates the use of setting up, counting or storing wheels.

Still another object of the invention is to provide a machine as outlined above which is capable of carrying out rapidly any kind of counting operation, including addition, subtraction, totalization, sub-totalization, and the printing of totals, sub-totals and balances as the case may be.

An embodiment of a machine according to the invention and the operation thereof are fully described hereinafter, reference being made to the drawings forming a part hereof and in which:

Figure 9 is a detail side view with a partial sectional view of the mechanism controlling the engagement of the counting frames or indicators;

Figure 16 is a side detail view with a partial section of the calculation mechanism corresponding to one of the sections of the machine;

Figure 17 is a horizontal sectional view through XVII—XVII of Figure 16;

Figure 18 is a side view of one of the carrying-over slopes;

Figure 19 is an end view of the same slope;

Figure 20 is a plan view of one of the stop bars of the calculation mechanism;

Figure 21 is a side view of the stops of this bar;

Figure 22 is an elevational view from the rear of a group of housings for keys pertaining to the calculation mechanism with the control device for locking the keys;

Figure 23 is a side view of one of the housings for the calculating keys;

Figure 24 is a cross-sectional view of the said housing;

Figure 26 is a plan view of this set of stirrup-pieces;

Figure 27 is an elevational detail view of the control mechanism for locking the releasing shafts in view of the totalization;

Figure 29 is a front view of the lower part of the recording mechanism showing the blades (reduction arms) which co-operate with the stop bars;

Figure 35 is a diagrammatical view representing the movements of the slides during the algebraic addition.

Figure 1:
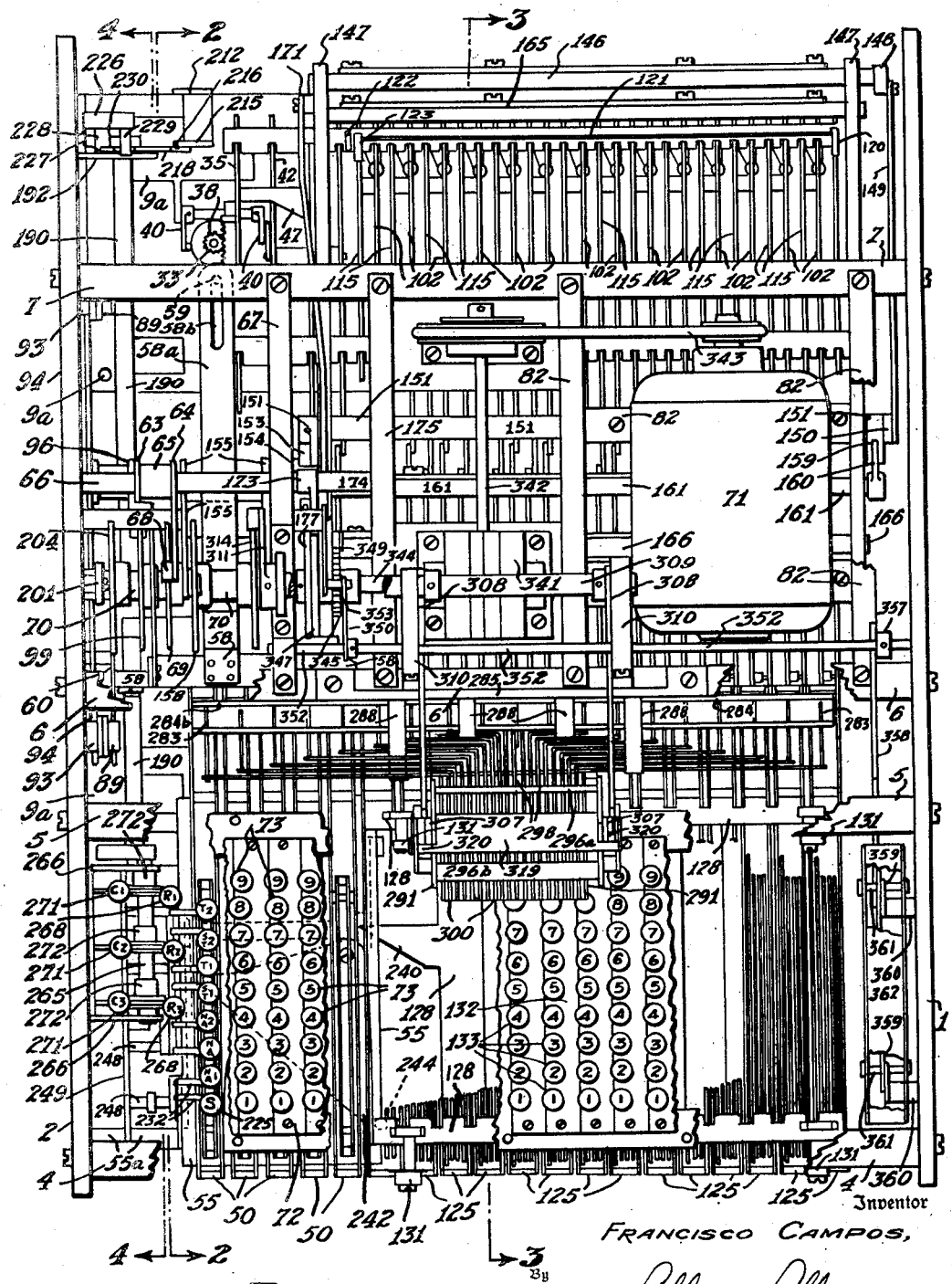
Figure 1 is a plan view from above of the whole of the machine, the cover and the carriage being supposed taken away.

The machine according to the invention, such as shown in this example, comprises a frame (see Figures 1, 2 and 3) formed of two cheeks, a right cheek 1 and a left cheek 2, united by struts 3 and four cross-pieces 4, 5, 6 and 7, the whole being mounted on four feet 8.

Figure 6:
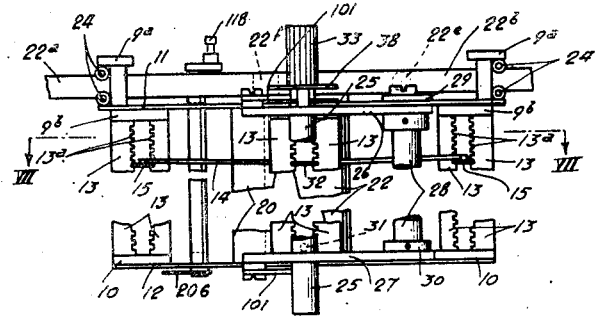
Figure 6 is a side detail view of one of the sections of the machine, all its slides being supposed removed.

This machine comprises two counting sections $A_1$ and $A_2$ each including 100 counting frames. Each of these sections is arranged in a rigid frame formed of an upper frame member formed itself of two pairs of cross-pieces 9a, 9b secured at their extremities to the cheeks 1 and 2 of the frame and of a lower frame member formed of a pair of cross-pieces 10 which are also secured to the cheeks 1 and 2. The cross-pieces 9b carry an upper bottom plate 11 (see Figures 6, 7 and 8) and the cross-pieces 10 carry a lower bottom plate 12. Secured to the cross-pieces 9b and 10 are vertical rack posts 13 and notches 13a of which serve as guides for the counting frames arranged horizontally one above another. Each of these counting frames is formed of an engaging triangle 14 provided at both ends of its base with laps 14a, 14b engaged into notches 15a provided in two bars 15 guided in the indentations of the racks 13a of the rack-posts 13. The bars 15 present along their length other notches 15b serving as guides for slides 16 in an equal number for each counting unit to the number of the orders of numeration in the highest sum which is to be recorded in the machine (for instance, in the form of execution shown in the drawings, this number is fourteen). Due to this arrangement the engaging triangle 14 and the bars 15 can slide longitudinally in the rack posts 13, while the slides 16 can move transversely on the bars 15.

Each slide 16 is provided on one of its edges with a series of ten calculation notches 17 corresponding to the number, less one, of the units of the base of numeration adopted in this example (the machine being arranged to operate in the decimal notation) and, on its other edge, with a series of ten notches or locking indentations 18. On the side of the notches 17 the slides 16 comprise, furthermore, a notch 19 the function of which will be explained later on. Opposite the locking indentations 18 of the slides 16 are arranged vertical locking bars 20 secured at their extremities to the bottom plates 11 and 12 and provided with a projecting edge 20a which, by engaging into one of the said indentations, insures the locking of the said slides in each of the positions which they are adapted to receive, and locking springs 21 secured to the engaging triangle 14 tend to move the slides 16 near the locking bars 20 and to maintain them in their locked position. The distance between the two notches (17 or 18) is what will be referred to hereafter as the pitch of the slides 16. In the present example, ten notches 17 are necessary to immobilize the slides 16 in ten different positions, but it is to be understood that the maximum total length of displacement of each slide is of nine pitches, that is to say, one less than the base of numeration.

Figure 7:
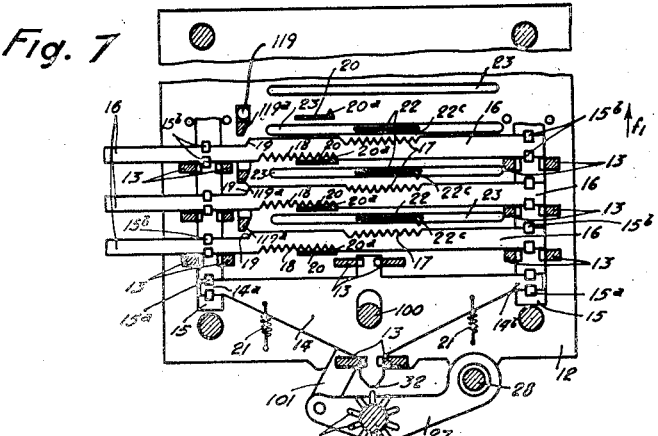
Figure 7 is a horizontal sectional view of the said section through VII—VII of Figure 6 showing the detail of a counting frame.

When a slide engages the corresponding locking bar 20a by its first notch, it is in its outmost position as represented on Fig. 7, that is to say, in the position corresponding to the figure nine (positive) or to zero (negative). When the slide engages the bar 20a by the second notch, the position is eight (positive) or one (negative). When the third notch is engaged, the position is seven (positive) or two (negative), and so on until the last or tenth notch is engaged, when the position should be zero (positive) or nine (negative). Opposite the calculation indentations 17 of the slides 16 are arranged upright bars 22 which can be transversely shifted and the lower ends of which are, for this purpose, mounted in slots 23 provided in the lower bottom plate 12 (see Figure 7) while their upper ends are provided with two horizontal arms 22a, 22b disposed at right angles with the upright bars 22 (see Figures 6, 8 and 16) and guided between rollers 24 mounted on the upper frame member 9a—9b of the section. The horizontal arms 22a of the upright bars 22 of the section $A_2$ are in register with the arms 22b of the upright bars of the section $A_1$, as shown more particularly in Figure 3. These upright bars 22 are provided with a vertical projecting edge 22c with which one of the notches 17 of the slides 16 can be brought into engagement during the translation of the counting frames in the direction of the arrow $f_1$ (Figure 7).

Each section of the machine comprises, for the control of this movement of translation of the counting frames, an engaging shaft or column 25 mounted on two levers 26 and 27 rigidly connected with a shaft 28 which can rotate in journals 29 and 30 secured to the bottom plates 11 and 12. The column 25 is provided with ten lateral fingers 31 arranged on its height along a helical line (see Figure 2) and is mounted on the levers 26 and 27 so as to be able to swing and simultaneously slide in the axial direction, this double movement allowing to bring one of the ten fingers 31 opposite the nose 32 of that of the counting frames which are superposed in each section, which must come into engagement for the calculation to be effected.

These movements of rotation and of sliding in the axial direction of the column 25 are effected and controlled from the keyboard of the machine which is located in front of the latter. For this purpose, on the column 25 of each section is keyed or secured in any other manner a pinion 33 engaging a rack 34 (see Figures 5 and 9) carried by a bar 35 which is guided between rollers 36 secured on the upper frame member 9a of the counters so as to be able to receive a longitudinal sliding movement. The rack 34 is mounted on the bar 35 by means of blocks 37 secured on the latter and in which it can slide so as to be able to accompany the pinion 33 while remaining in engagement with the same when the column 25 is angularly displaced about the axis of the shaft 28 by the levers 26 and 27 as will be described later on. On the column 25 is secured, furthermore, a rope pully 38 into the groove of which penetrates a finger 39 secured to one of the arms of a two-armed lever 40 pivotally mounted on the upper frame member 9a of the counting units. The other arm of the lever 40 projects perpendicularly to the first one and carries a finger 41 which is engaged in a vertical slot 42a provided in a bar 42 guided as the bar 35 between the rollers 36. Under these conditions every longitudinal movement of the bar 35 determines through the medium of the rack 34 and the pinion 33 a corresponding rotation of the engaging column 25 and every longitudinal movement of the bar 42 determines through the medium of the lever 40 and the pulley 38 a corresponding axial (upward or downward) sliding movement of the said column.

Figure 5:
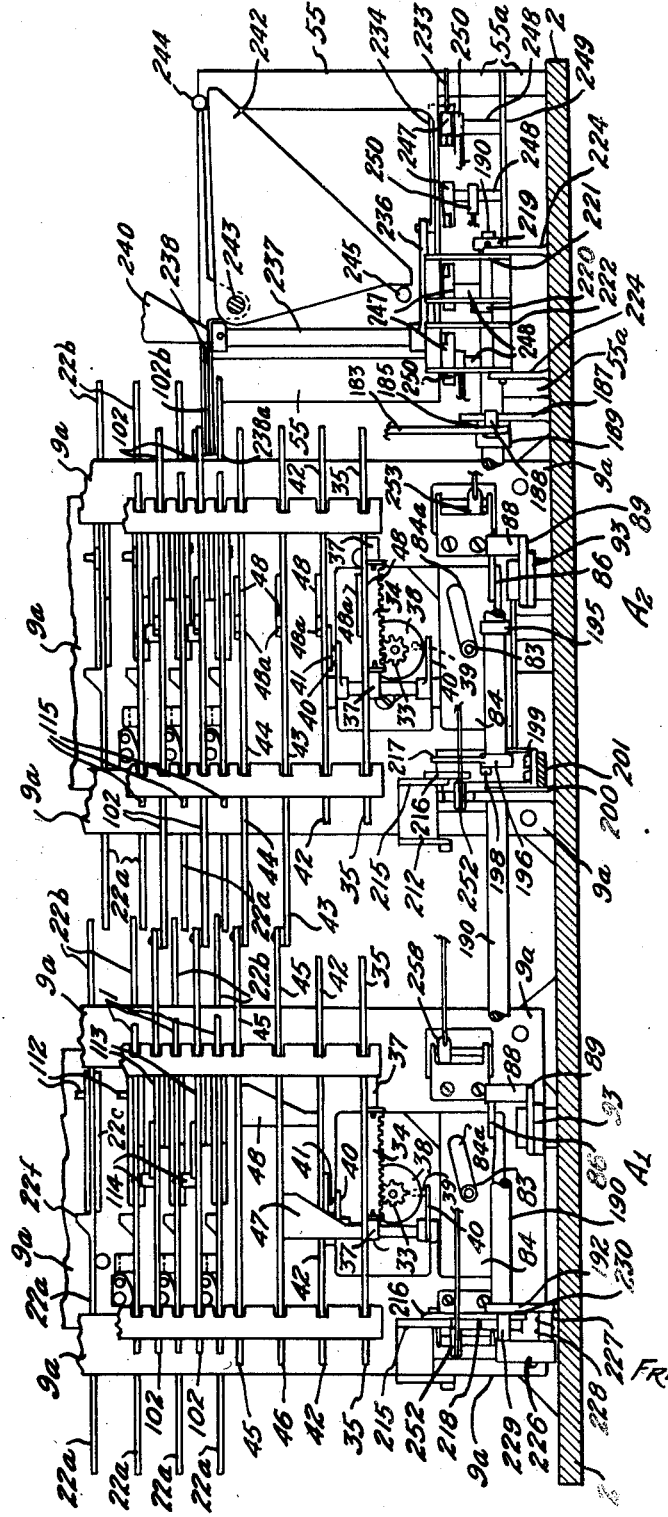
Figure 5 is a partial horizontal view in a section through V—V of Figure 2.

Parallel to the bars 35 and 42 of the section $A_2$ are two auxiliary bars 43 and 44 slidably mounted in the same conditions as the bars 35 and 42 and connected through the medium of bars 45 and 46 and connecting plates 47 and 48b respectively to the bars 35 and 42 of the section $A_1$ (see Figure 5). The bars 35 and 42 of the section $A_2$ and the above mentioned auxiliary bars 43 and 44 each carry, on their upper edge, a gusset 48 provided with a notch 48a in which is engaged, for each of the said four bars, an axle 49 secured to the end of a control bar 50 which will be, in the following, called a stop bar. Each of the four stop bars 50 comprises (see Figures 10 and 11) two parallel plates 50a, 50b united together by braces 51 and by the axle 49. Between the plates 50a and 50b are fastened two blades 52a, 52b arranged so as to be parallel with one another and provided on their upper edge, the one, 52a, with five projecting teeth and the other, 52b, with four similar teeth which are staggered with respect to one another and the function of which will be explained later on.

These four stop bars 50 are located together in the front part of the machine (see Figures 1, 2, 9 and 12) in a rigid holding frame formed of horizontal cross-pieces 53, between which they are guided by rollers 54 so as to be able to slide longitudinally without being able to be shifted laterally. The frame 53 itself is secured, on one hand, on a sheet metal holder 55 secured by struts 55a to the frame of the machine and, on the other hand, to the cross-piece 4 by means of a connection plate 56 (see Figure 12). The stop bars, which are thus slidably mounted in the frame 53, are constantly urged towards the back part of the machine by springs 57 secured to the frame 53 (see Figure 9). They are simultaneously maintained in their normal position of rest against the action of the springs 57 by a T-shaped stopping piece 58 the middle arm 58a of which is provided with a longitudinal slot 58b by which it is guided on a guide pin 59 secured to the cross-piece 7 of the frame (see Figures 1 and 2) and the lateral arms of which are guided in grooves 60a provided in holding plates 60 secured to the frame. On the stopping piece 58 is pivotally secured in a strap 61 a driving rod 62. This rod is connected, on the other hand, with a lever 63 rigidly secured to a second lever 64 by means of a socket 65 rotating about an axle 66 secured to the cheek 2 of the frame and on an intermediary holder 67 secured to the cross-pieces 6 and 7 of the frame. The lever 64 carries at its free end a roller 68 which rests against a cam 69 keyed on a shaft 70 journalled in the cheek 2 and in the holder 67. The shaft 70 is rotated by a motor, for instance an electric motor 71, as explained later on, mounted on a holding frame 82 also secured to the cross-pieces 6 and 7 of the frame.

The profile of the cam 69 is established so as to maintain, while at rest the lever 64 and consequently the lever 63 and the rod 62 in the position for which the stopping piece 58 locks the stop bars 50 against the action of their return springs 57 and so as to lower, the roller 68 during the rotation of the shaft 70, and thus cause an angular movement of the levers 64 and 63 the stopping piece 58 being then carried along in the direction of the arrow $f_2$ (Figure 9) and releasing the stop bars 50. The latter can then follow the urging action of the springs 57 and move towards the rear-part of the machine in order to carry along the bars 35 and 42 which control, in the above described manner, the movements of rotation and of sliding in the axial direction of the engaging column 25 of each section.

Figure 2:
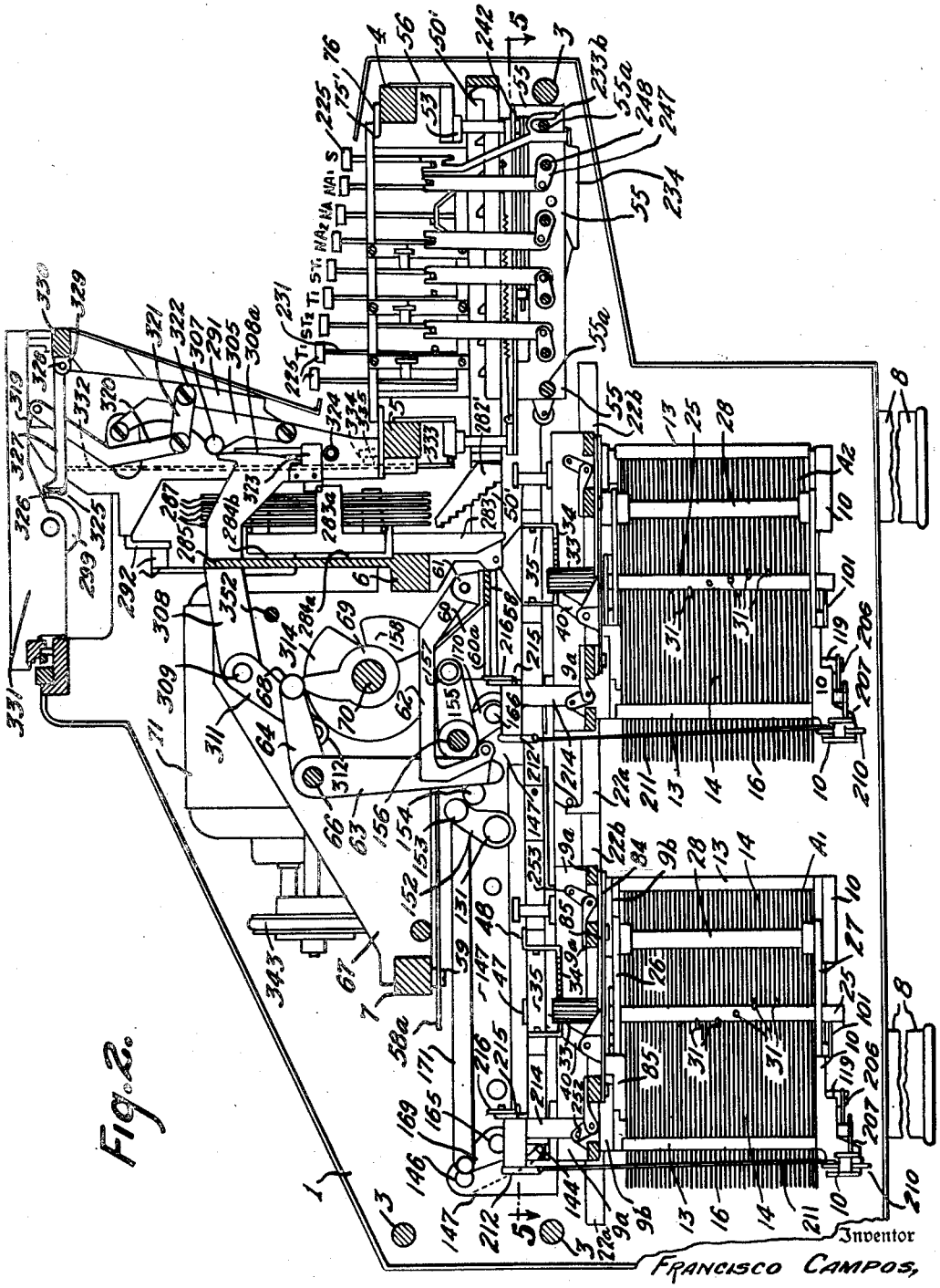
Figure 2 is a side view of the machine in a section through II—II of Figure 1.
Figure 2A:
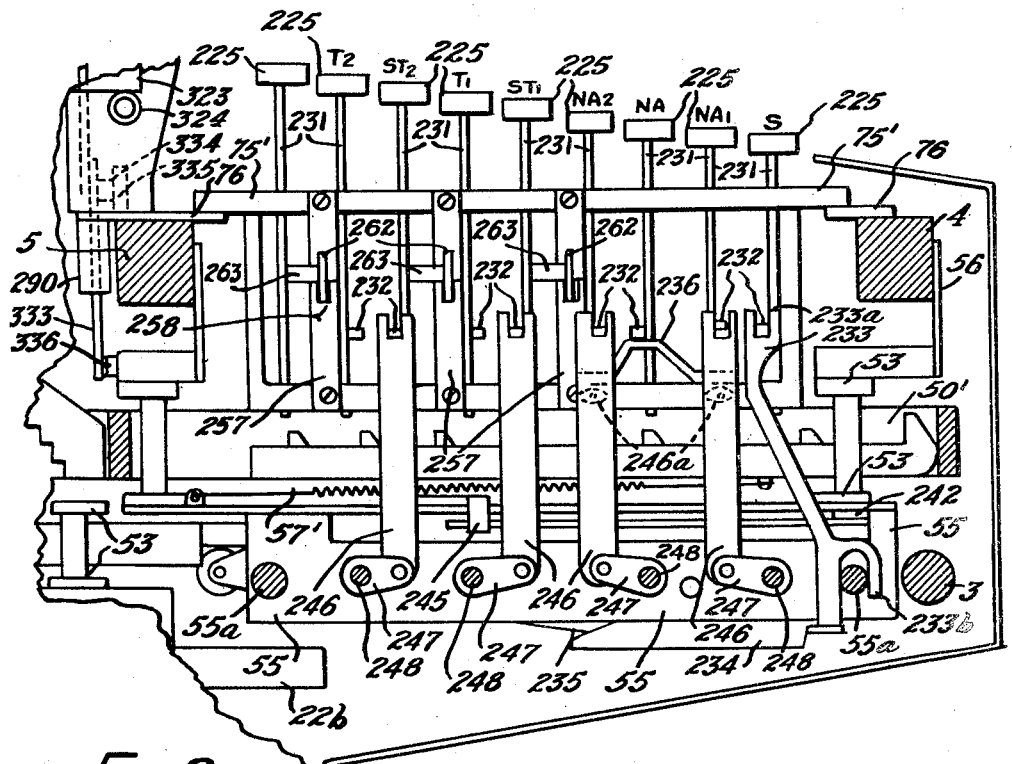
Figure 2a is a fragmentary view corresponding to the right hand end of Figure 2, but on an enlarged scale to permit application of reference numerals.
Figure 3:
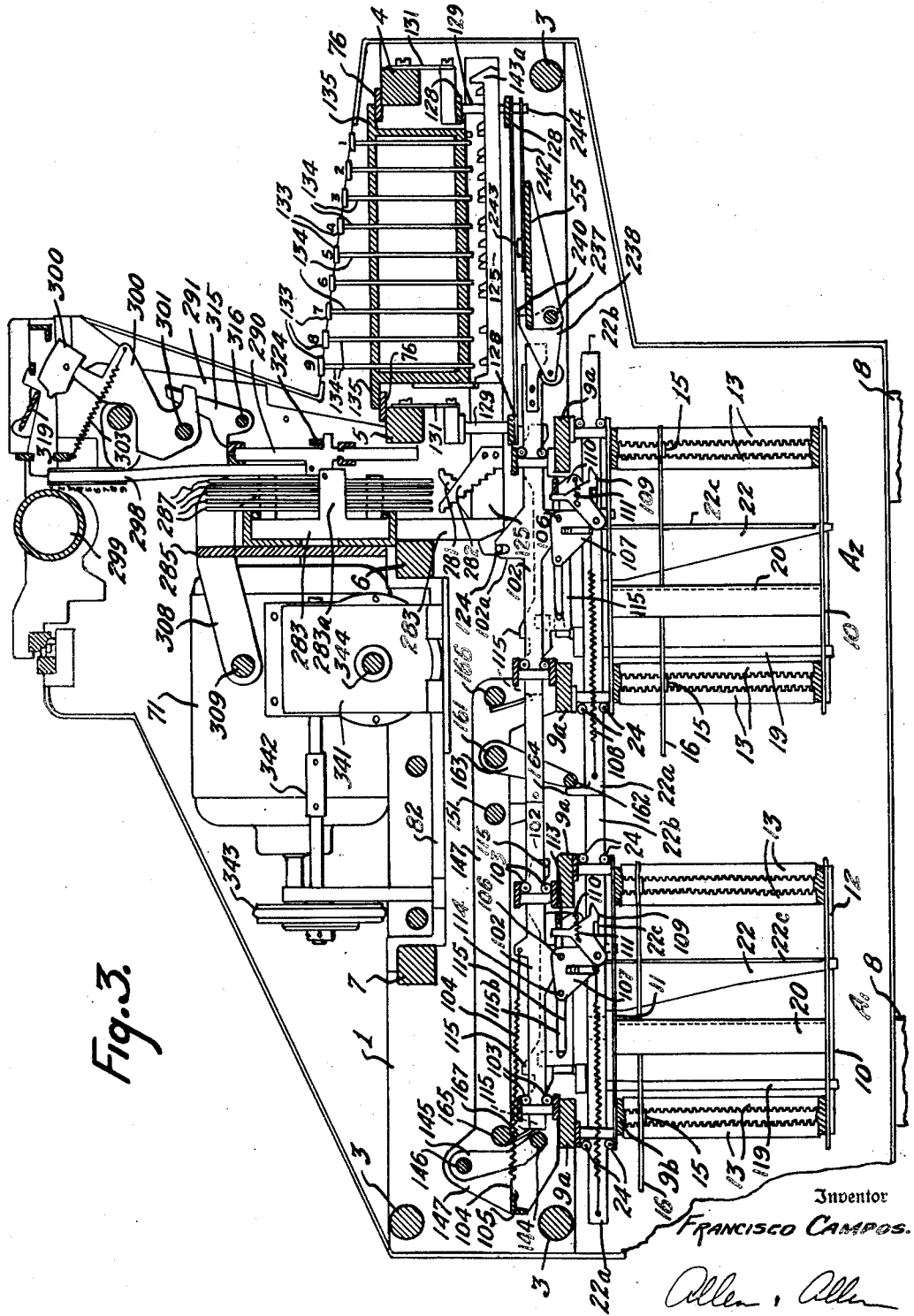
Figure 3 is a side view in a section through III—III of Figure 1.
Figure 13:
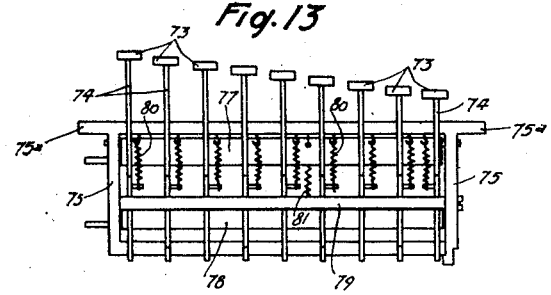
Figure 13 is a side view of a housing for the keys controlling the engagement of the counting frames.
Figure 14:
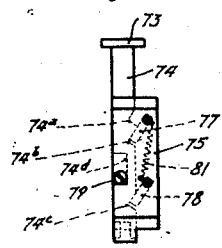
Figure 14 is an end view of the said housing.

The movement of the stop bars 50 and that of the column 25 which depends thereon are controlled by a keyboard 72 located in front of the machine above the stop bars 50 (Figures 1 and 2). This keyboard is formed of four rows of keys 73 arranged in a parallel direction with the stop bars 50, each of the said rows comprising nine keys corresponding to the nine units of the decimal notation and marked with digits corresponding to these units so that with the two rows of keys 73 on the right, it is possible to compose the running number of an account frame comprised in the counting section $A_1$ of the machine (for instance the 10th account frame of said section, by depressing only key No. 1 of the second row of keys 73 from the right, or the 58th account frame by depressing key No. 5 of said row and key No. 8 of the first row on the right), whereas the same may be done in relation with the account frames of counting section $A_2$ with the keys of the two rows of keys 73 on the left. The keys 73 are respectively secured at the upper end of vertical rods 74 and the rods 74 corresponding to each row of keys 73 and to each stop bar 50 are mounted in a frame or housing 75 secured by ears 75a on flat cross-pieces 76 attached on the cross-pieces 4 and 5 of the frame of the machine. The rods 74 are formed of flat blades which can slide in a vertical direction in grooves provided for them in their respective housings 75 (see Figures 13, 14 and 15). The rods 74 are notched on one of their vertical edges and provided with three notches 74a, 74b, 74c having sloping edges and adapted for co-operating with two parallel flaps 77 and 78, the ends of which are pivotally mounted in each housing. On their opposite vertical edge the rods 74 are provided with a rectangular notch 74d in which is engaged a horizontal rod 79 secured at its ends to the front and back ends of the housing 75. Springs 80 secured to each rod 74, on one hand, and to the upper part of the housing, on the other hand, constantly tend to bring the rods 74 upwardly, their movement in this direction being limited by the lower edge of the notch 74d striking against the rod 79. On the other hand, a spring 81 connects the flaps 77 and 78 and tends to maintain them bearing against the upper sloping edges of the notches 74b, 74c, respectively, when the rods 74 occupy their high position (see Figure 15).

Under these conditions when one of the keys 73 is vertically depressed, the corresponding rod 74 sinks into the housing against the action of its spring 80, thus causing the flaps 77 and 78 to yield back. When the said rod 74 has come to the end of its downward course the upper flap 77 engages the notch 74a of the rod, thus preventing the latter from rising again, while the lower flap 78 remains tilted in a position in which it is released from the notches 74c of all the rods of the housing. If another key 74 is now depressed, the upper edge of its notch 74b pushes down the flap 77 which releases the rod 74 formerly sunk into the housing; this rod is then returned by its springs 80 to its high position, while the new rod 74 driven into the housing is now locked in this lower position by the flap 77.

At their lower end the rods 74 are respectively provided with fingers 74e for the rods carrying the keys 73 corresponding to odd digits (1, 3, 5, 7 and 9) and fingers 74f, located at the right, for the rods carrying the keys corresponding to even digits (2, 4, 6 and 8). In each row of rods, the fingers 74e are above the blade 52a of the corresponding stopping bar 50 and the fingers 74f are above the blade 52b so that when one of the rods 74 is depressed as above explained, its finger 74e or 74f according as it is a rod corresponding to an even or odd digit comes to lie in the way of one of the teeth of the blade 52a or of the blade 52b and limits the movement toward the rear of the machine of the stop bar 50 carrying this blade. Thus, the stopping bars 50 are fixed in positions determined by the rods 74 which have been depressed. The spacing of the teeth on the blades 52a and 52b and that of the rods 74 in each row is such, with respect to the distribution of the fingers 31 on the engaging column 25, that, to each position of fixation of the stop bars 50 corresponds the bringing of a finger 31 opposite a nose 32 of a counting frame 14, 15, 16. Such an arrangement does not, in any way, limit the number of counting frames which can be successively engaged in this operation. Indeed, on the one hand, as above mentioned, the fingers 31 are distributed on the column 25 along a helical line and for each position of a stop bar 50, the column 25, under the action of the bar 35 and the rack 34 rotates through such an angle that a well determined finger 31 is brought opposite the vertical line of noses 32. On the other hand, the fingers 31 are distributed on the height of the column 25 at intervals which correspond to the thickness of a group of ten consecutively superposed counting frames and, for each position of a stop bar 50, the axial movement of the column 25 resulting of the action of the bar 42 and the lever 40 takes place at such a height that the finger 31 disposed in the above mentioned manner opposite the vertical line of the noses 32 is brought to the level of that one of the noses 32 corresponding to the counting frame which must intervene for the calculation to be effected and which is determined by the keys 73 which have been depressed on the keyboard.

Figure 4:
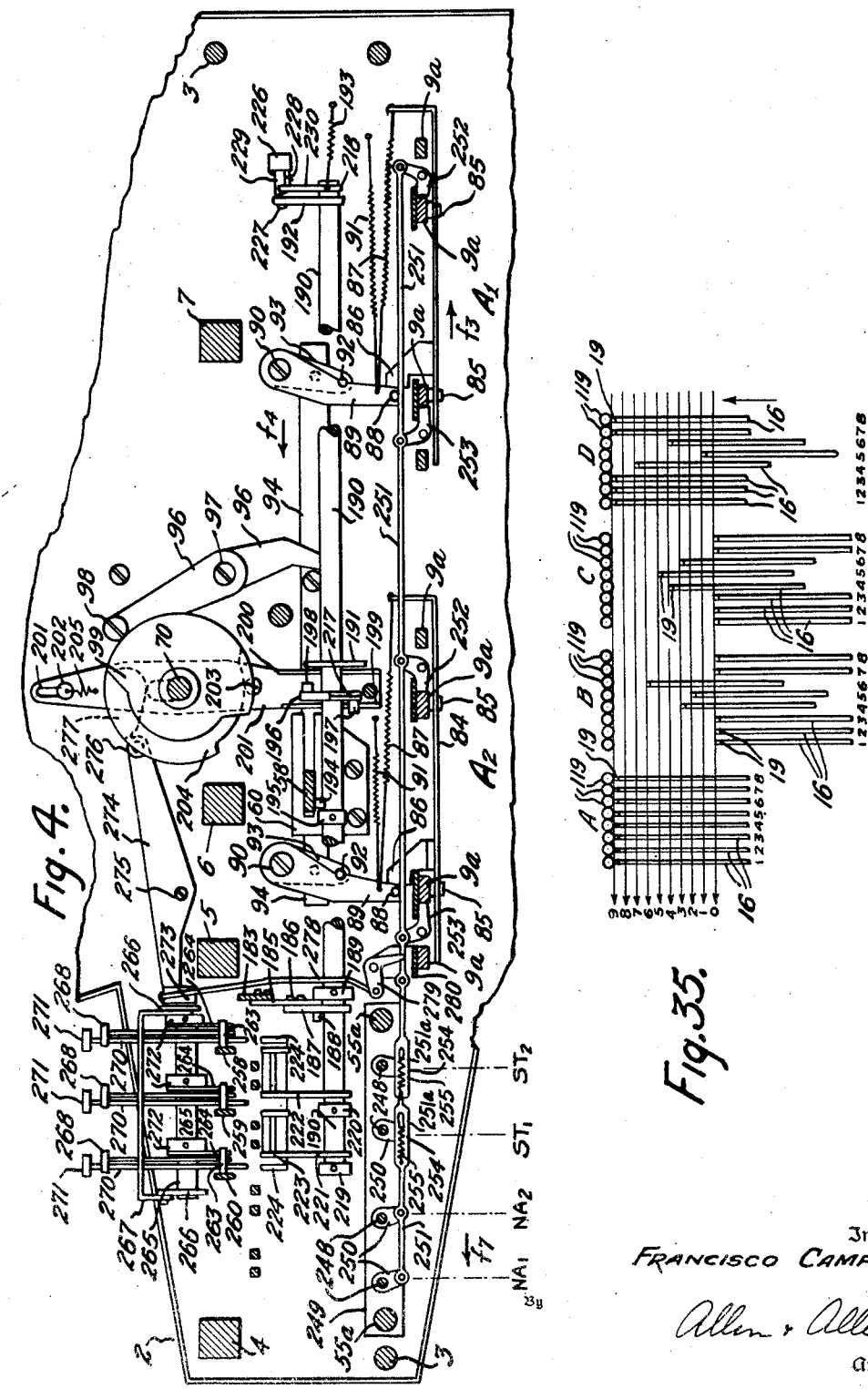
Figure 4 is a side view in a section through IV—IV of Figure 1.

The translation of the counting frames in the direction of the arrow $f_1$ (Figure 7), under the action of the fingers 31 of the engaging column 25, which translation has for its purpose to bring one of the notches 17 of the slides 16, forming each of the said counting frames into engagement with the vertical projecting edge 22c of the corresponding upright bars 22 is effected by means of the following mechanism:

The upper lever 26 of the column 25 of each section carries a roller 83 engaged in a sloping slot 84a provided in a movable bar 84 guided between rollers 85 mounted on cross-pieces pertaining to the upper frame number 9a of the counters (see Figures 2, 4 and 5). The longitudinal movement of the bar 84 thus entails a movement of the roller 83 resulting in an angular movement of the lever 26 and therefore in the rotation of the shaft 28. The movement of the engaging bars 84 corresponding to both sections is controlled by the following mechanism:

The said bars 84 respectively carry noses 86 which springs 87 tend to apply against rollers 88 mounted at the end of levers 89 themselves pivotally mounted at 90 on the left cheek 2 of the machine. Springs 91 secured to the frame tend to apply the levers 89 against stop fingers 92 secured to levers 93 also pivotally mounted on the axle 90. On the levers 93 is pivotally mounted a push rod 94 carrying a finger 95 on which acts one of the ends of a two arm lever 96, pivotally mounted at 97 on the frame of the machine. At its other end the lever 96 carries a roller 98 which rests against the periphery of a cam 99, keyed onto the above mentioned shaft 70.

In the resting position of the machine, shown in Figure 4, one sees that the stops 92 of the levers 93 lock the levers 89 against the action of the springs 91; thus, the bars 84 which are attracted by the springs 87 remain in their resting position, that is to say towards the front of the machine. The profile of the cam 99 comprises a projecting sector-form part and this cam is keyed on the shaft 70 in such a position that, when the said cam, carried along by the shaft 70, is rotated, the hollow part of its profile allows the lever 96 to be tilted; the stops 92 then release the corresponding levers 89 and the bars 84 are moved towards the rear of the machine in the direction of the arrow $f_3$ under the action of the springs 91. The engaging column 25, carried along by the rotation of the shaft 28 resulting, as above mentioned, from the movement of the corresponding bar 84, is moved in such a manner that that of its fingers 31 which, at this moment, lies opposite the nose 32 of one of the counting frames, comes to rest against the said nose and pushes back the counting frame the slides 16 of which are then released and moved in the direction of the arrow $f_1$ (Figure 7). The small slides 16 thus come into engagement by one of their notches of numeration 17 with the edge 22c the upright bars 22.

Figure 8:
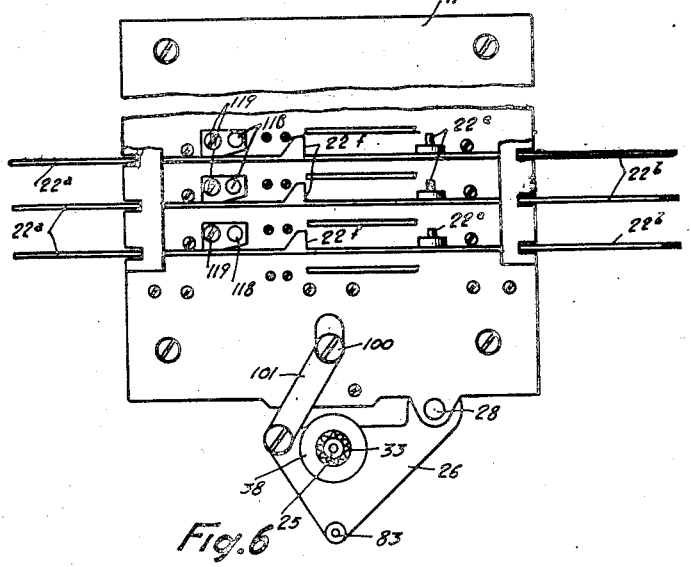
Figure 8 is a plan view from above corresponding to Figure 6.

If the cam 99 continues to turn, the projecting part of its profile strikes against the roller 98 and through the medium of the lever 96 pushes back the rod 94 in the direction of the arrow $f_4$ (Figure 4) so that the stop 92 of the levers 93 again locks the levers 89, thus causing the return of the bars 84 under the action of the springs 87 towards the front of the machine. During this part of the movement of the shaft 70 and during the resting period of this shaft, the fingers 31 of the engaging column 25 are maintained at a distance from the noses 32 of the counting frames and all the slides 16 stay locked through the springs 21 against the locking bars 20. To control this return of the counting frames to their position of rest, a rod 100 connected by links 101 to the levers 26 and 27 can furthermore be inserted into button holes provided in the triangles 14 and in the bottom plates 11 and 12 (Figures 7 and 8).

To each of the upright bars 22 with which the numeration notches 17 of the slides 16 come into engagement during the first part of the movement of the shaft 70 corresponds a driving bar 102 mounted so as to be able to receive a horizontal movement of translation (under the action of a control which will be described later on) between guide rolls 103 secured to crosspieces pertaining to the upper frame member 9a of the counters (see Figures 16 and 17). The driving bars 102 of each of the sections are coupled with the driving bars 102 of the other section, as more particularly shown in Figure 3 and the so coupled bars are each acted upon by a stretched spring 104 secured to a cross-piece 105 fast with the frame and tending to draw them towards the rear of the machine.

On each of the driving bars 102 is pivotally mounted by means of an axle 106 a right angle lever 107 to which the horizontal arm 22a of the corresponding upright bar 22 is attached by a return spring 108. At the lower end of the vertical arm of the lever 107 are linked, by an axle 112 a pawl 109 and a counter-pawl 110 connected together by a spring 111. The pawl 109 is provided with a notch 109a into which fits a driving finger 22e secured to the horizontal arm 22a of the upright bar 22. On the other hand, the arm 22a of the upright bar 22 carries a lateral projection 22f (Figure 17) which is so arranged that it comes to strike against the axle 112 of the pawl 109 when the driving finger 22e is released from the notch 109a of the said pawl and the upright bar 22 is attracted towards the front of the machine by the spring 108. The stop 22f occupies such a position that this movement of the upright bar 22 is exactly equal to the length of the slides 16 of a number of pitches 17 of the slides 16 (Figure 1) corresponding to the base of numeration which is adopted, that is to say ten in the example chosen with the decimal notation. Moreover, the pawl 109 comprises a finger 109b which rests, under the action of the spring 111, on a pin 113 secured to the counter-pawl 110. At the end of the horizontal arm of the lever 107 is secured a pin 114 which lies substantially in the same horizontal plane as the pin 113 of the counter-pawl 110 but in a different vertical plane (see Figure 17).

The pins 113 and 114 of the so formed units fit two by two into longitudinal slots 115a provided in carrying-over slopes 115 arranged in a parallel direction with the driving bars 102 and guided longitudinally between two rolls similar to the rolls 103 which guide the latter. Each of these carrying-over slopes corresponds to a distinct order of numeration and the longitudinal slot of each of them receives, on one hand, the pin 113 of the counter-pawl 110 corresponding to the upright bar 22 and to the slide 16 adjoined to the same order of numeration as the said slot and, on the other hand, the pin 114 of the lever 107 corresponding to the upright bar 22 and to the slide 16 of the next higher order of numeration. When considering, for instance, the pins 113 and 114 corresponding to the slide 16 of the hundreds, it may be seen that the pin 113 of the counter-pawl 110 fits into the slot 115a of the carrying-over slope 115 corresponding to the hundreds, while the pin 114 of the lever 107 fits into the slot of the carrying-over slope corresponding to the tens. The pin 114 of the lever 107 corresponding to the lowest order of numeration fits in a similar manner into a slot of a special carrying-over slope 116 the construction and the function of which will be described later on.

Each carrying-over slope 115 can slide longitudinally in the guide-rolls 103 and it is provided with two sloping parts 115b, 115c which are so arranged that they can fit between the corresponding rolls 103 during the said longitudinal sliding movement, which simultaneously imparts to the said slope a movement of translation in the upward direction (or conversely) the amplitude of which is a function of the profile of the sloping parts 115b and 115c and from which results a movement, in the upward (or downward) direction and with the same amplitude, of the pins 113 and 114 and of the members to which they pertain. Springs 117 secured, on one hand, to each of the carrying-over slopes 115 and, on the other hand, to the upper frame member 9a of the frame of the counting units constantly tend to return the said slopes toward the rear of the machine, that is to say to their highest position. The said slopes are normally maintained in their lowest position against the action of the springs 117 by stops 118 against which they rest with a bent edge 115d formed on the same (see Figures 17, 18 and 19). The stops 118 are eccentrically secured at the upper end of releasing shafts 119 journalled at their ends in the bottom plates 11 and 12 of the frame of the counting units opposite the rear part of the slides 16. Between the bottom plates 11 and 12 each of the shafts 119 is provided with an eccentric part 119a (see Figure 7) which is so arranged that when the corresponding slide 16 of a counting frame engages the indentation 22c of its upright bar 22 and is moved to the left until it reaches its outmost position, its indentation 19 comes to strike against the said eccentric part 119a and thus rotates the releasing shaft 119 by a certain angle. During this rotation the stop 118 carried by this shaft is released from the bent edge 115d of the carrying-over slope 115 which corresponds to the same and the said slope is then released and can move longitudinally under the action of its spring 117 and simultaneously rise on account of the sloped parts 115b and 115c while carrying with it in the upward direction the pins 113 and 114 of the counter-pawl 110 and of the lever 107. This determines, on the one hand, the disclutching of the driving finger 22e of the upright bar 22 corresponding to the slide 16 which has caused the release and thus the return of the said upright bar under the action of the spring 108 until its projection 22f has come to strike against the axle 112, and, on the other hand, an advancing movement of the upright bar 22 of the next higher order of numeration, the arrangement of the pieces being such that the said advance is equal to the pitch of the slides 16.

Contrary to the carrying-over slopes 115, the slope 116 to which is connected the pin 114 of the lever 107 corresponding to the lowest order of numeration is not provided with a stop edge 115d. It is stopped in the normal position by a pawl 120 fast with a horizontal shaft 121 pivotally mounted in bearings 122 carried by the frame 9a. At the end of the shaft 121, opposed to the pawl 120, is keyed a lever 123 which rests on a shoulder 115e of the last carrying-over slope 115 (see Figure 18). When this slope is released by the corresponding releasing shaft 119 (that is to say the shaft 119 adjoined to the highest order of numeration) it raises the lever 123 and, accordingly, also the pawl 120. The slope 116 being freed is attracted by its spring 117 and slides between the rolls 103, thus causing the displacement of the pin 114 of the lever 107 which is connected with the said slope.

The driving bars 102 of the section A₂ are each provided on their upper edge with a gusset 102a provided with a notch into which fits an axle 124 secured to the end of a stop bar 125 similar to the stop bars 50 which have been previously described for the control of the operation of the various counting frames or counting units of each section. Each of the stop bars 125 comprises (see Figures 20 and 21) two parallel plates 125a, 125b connected together through braces 126 and by the axle 124. Between the plates 125a and 125b are secured four blades 127a, 127b, 127c, 127d arranged so as to be parallel to one another and provided respectively on their upper edge with four projecting teeth acting as stops and in staggering relation with one another.

All the stop bars 125 the number of which is equal, like that of the slides 16 of each counter to the number of orders of numeration to be taken into consideration in the machine, that is to say fourteen in the example shown, are mounted in a rigid holding frame formed of horizontal crosspieces 128 connected together by pillars 129 and between which the stop bars 125 are guided by rollers 130 (see Figures 3, 12 and 16) so as to be able to slide longitudinally, independently of one another. The holding frame 128 is suspended from the cross-pieces 4 and 5 of the frame of the machine by links 131 owing to which it can receive, together with the whole of the stop bars 125, a transverse movement of translation during which it remains constantly horizontal. The axles 124 which connect the stop bars 125 with the driving bars 102 are made long enough to allow this transverse movement of the stop bars, the function and the control of which will be described later on.

Above the stop bars 125 is arranged a keyboard 132 comprising, like the keyboard 72 which serves for the setting into action of the various counting units, rows of keys 133 arranged so as to be parallel to the stop bars 125. The rows of keys, which are here in the number of fourteen, correspond respectively to the different orders of numeration provided for the use of the machine and comprise each, as previously indicated for the rows of keys 75, nine keys corresponding to the nine units of the base of numeration and marked with digits corresponding to these units. The keys 133 are respectively secured on vertical rods 134 and the rods corresponding to each row are located in a housing 135 (see Figures 22, 23 and 24), identical to the housing which has been described above for the keyboard 72, and they are combined there, also in an identical manner, with two tilting parallel flaps 136 and 137 so that a single rod 134 of each housing can be depressed at one time. Therefore, this mounting will not be more particularly described and there will be described here only certain particular dispositions of the keyboard 132 which are of no use for the above described keyboard 72.

To these particularities belongs the fact that the lower flap 137 of each housing 135 carries at its end towards the rear of the machine a finger 138 which projects out of the keyboard and which can move during the tilting movement of the said flap in a window 135a provided in the corresponding end of the housing (see Figure 22). Opposite this finger 138 is located a bent lever 139 pivotally mounted on the end of the housing 135 about an axle 140. To the upper arm of the lever 139 is attached a spring 141 which constantly tends to return the bent part of this lever towards the finger 138 of the flap 137. The lower arm of the lever 139 is provided with a buttonhole 139a by which it is guided on a screw 142 secured to the housing 135, and it carries a finger 139b projecting downwardly and arranged so that in the normal position (that is to say when no key of the corresponding housing has been depressed and when the whole of the bars 125 has not been displaced) it lies opposite a locking tooth 143 formed at the end of the blade 127a of the corresponding stop bar 125. Thus the finger 139b prevents every longitudinal sliding movement of this stop bar towards the rear so long as one of the keys 133 has not been depressed or that the whole of the bars 125 has not been transversely displaced. When one of the keys 133 is depressed the corresponding rod 134 tilts the flap 137 in the manner described for the keyboard 72 and maintains it tilted so long as the said rod itself remains depressed. The finger 138 of this flap pushes the lever 139 aside and maintains it aside in this position so long as the rod under consideration remains depressed, so that the finger 139b of the lever 139 yields back before the locking tooth 143, thus freeing the stop bar 125.

At their lower ends the rods 134 of the keyboard 132 are provided respectively, like the rods 74 of the keyboard 72, with fingers 134e located at the left for the rods corresponding to the odd digits (1, 3, 5, 7 and 9) and fingers 134f located at the right for the rods corresponding to the even digits (2, 4, 6 and 8). When all of the stop bars 125 are in the normal position, that is to say when the frame 128 which carries them occupies the position shown in Figure 12 (which, as it will be seen later on, is the position of addition), if one of the keys 133 is depressed, the lower end of the corresponding rod 134 is lowered so that its finger 134e or 134f lies in the way of one of the teeth of the blade 127a or 127c respectively of the corresponding stop bar 125 according as the depressed key is a key corresponding to an odd digit or a key corresponding to an even digit. On the contrary, if all of the stop bars 125 have been transversely displaced to the left of the machine (which, as it will also be seen later on, represents the position of subtraction) the finger 134e or 134f of the depressed rod 134 comes to lie in the way of one of the teeth of the blade 127b or 127d respectively, according as the depressed key corresponds to an odd or even digit. In every case, the movement of the said stop bar towards the rear of the machine and, accordingly, the movement of the corresponding driving bar 102, will, therefore, be limited to stopping position determined by that of the key 134 which has been depressed in the corresponding row of the keyboard 132.

The front wall of each housing 135 is provided, moreover, in its lower part, with a tooth 135b projecting downwardly and arranged so as to act as a stop for a tooth 143a formed at the front end of the blade 127a of the corresponding stop bar 125, when all of the stop bars 125 have been transversely displaced in the manner which will be explained later on (in which case the tooth 139b of the lever 139 lies out of reach of the tooth 143 of the same blade 127a and does not stop the longitudinal sliding movement of the said stop bar towards the rear) and when no key 133 has been depressed by the operator. Under these conditions the stop 125 under consideration slides freely towards the rear until the tooth 143a strikes against the said projection 135b. The distance between the projection 135b and the tooth 143a in the normal resting position of the stop bar 125 is equal to the length of as many pitches of the slides 16 as there are units less one, in the base of numeration used, i. e. nine in the example chosen with the decimal notation.

Figure 25:
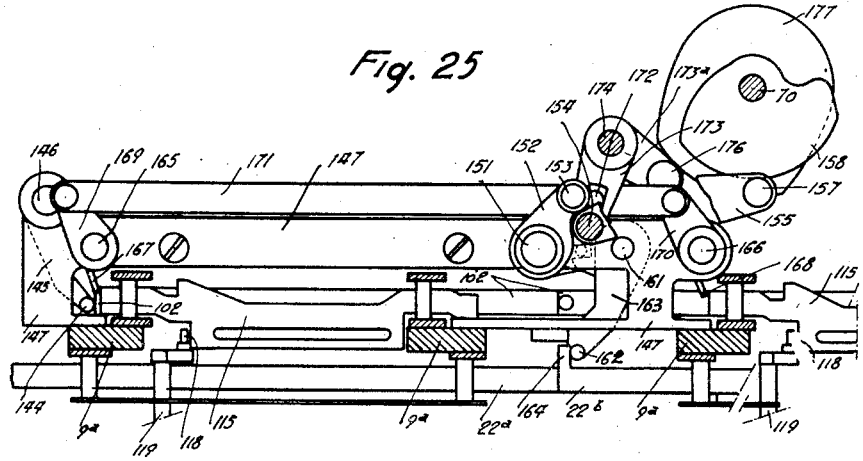
Figure 25 is a side detail view with a partial sectional view of the set of stirrup-pieces controlling the return of the driving bars and of the carrying-over slopes.

The driving bars 102 and the stop bars 125 which are rigidly connected to them as regards longitudinal movement are returned to and normally maintained in the resting position (i. e. in their outmost position towards the front of the machine) by a stirrup piece (see Figures 25 and 26) formed of a transverse rod 144 secured at its ends to two levers 145 rigidly connected with a common shaft 146 journalled in two parallel bearings 147 mounted on the upper frame members 9a of the counting frames, the said rod 144 engaging the rear ends of the driving bars 102. The shaft 146 is connected by a lever 148 with the end of a push rod 149 the other end of which is connected by a lever 150 with a shaft 151 journalled in the bearings 147. On the shaft 151 is keyed a lever 152 which carries at its free end a roller 153 on which acts a roller 154 arranged on one of the arms of a two-armed lever 155 rotatably mounted on an axle 156 secured to the cheek 2 of the frame and to the holder 67. The other arm of the lever 155 carries at its end another roller 157 which rests against a cam 158 keyed on the shaft 70. On the shaft 151 is secured a third lever 159 to which is connected by a link a lever 160 keyed on a shaft 161 journalled in both bearings 147. The shaft 161 carries a stirrup similar to the stirrup 144 and formed of a transverse rod 162 connected with it by two levers 163 and engaging a finger 164 provided on the horizontal arms 22a—22b of the upright bars 22 at the point of junction of the arms 22b of the section A₂ with those 22a of the section A₁. The function of this stirrup 162 is to return the upright bars 22 to their normal or resting position and to bring the fingers 22e provided on their horizontal arms 22a into engagement with the pawls 109 against the force of the springs 108 (see more particularly Figure 16).

In the bearings 147 are furthermore journalled two shafts 165 and 166 carrying stirrups 167 and 168 formed of small plates secured on the said shafts and engaging respectively the rear ends of the carrying-over slopes 115 of each of the sections A₂ and A₁. These stirrups 167 and 168 are adapted for returning all the carrying-over slopes 115 to and maintaining them in their normal or resting position, i. e. disengaged from the stops 118 of the releasing shafts 119. The shafts 165 and 166 which carry these stirrups are connected together through the medium of levers 169 and 170 and of a push rod 171. The rod 171 carries a roller 172 on which is engaged a forked lever 173 rotatably mounted on an axle 174 secured to the bearing 67 and to a similar bearing 175 secured like this latter to the cross-pieces 6 and 7 of the frame. The lever 173 comprises a second arm 173a carrying at its end a roller 176 which rests against a cam 177 keyed on the shaft 70.

The form of the cams 158 and 177 and the arrangement of the various systems of connecting rods which have been described above is such that, when the shaft 70 turns over once, and when the rollers 157 and 176 roll on the profile of small diameter of the cams 158 and 177, the stirrup 144 is drawn away from the driving bars 102 and abandons them to the action of their springs 104; the stirrup 162 also leaves the arms 22a, 22b of the upright bars 22 and the stirrups 167 and 168 leave the carrying-over slopes 115. The shaft 170 pursuing its rotation, when the part of larger diameter of the cams 158 and 177 engages the rollers 157 and 176, the stirrups return to their normal position and thus again bring the bars 102 and 115 as well as the arms 22a, 22b of the upright bars 22 respectively to their normal position.

The locking of the various keys of the keyboard in the position to which they have been brought by the operator for a determined operation is effected by means of the following mechanism:

On the housings of the keyboard 135 (Figure 22) is mounted a bar 178 which can slide transversely and which is provided, for this purpose, with slots 178a through which it is guided on guiding fingers 179 secured with a suitable spacing on the housings 135. This bar 178 is provided on its upper and lower edges with teeth 180 and 181 which can engage respectively fingers 182 provided at the ends of the flaps 136 of the various housings 135 and fingers 138 provided at the ends of the flaps 137. The upper teeth 180 are conformed and disposed so as to tilt all the flaps 136 by means of the fingers 182, when the bar 178 moves in the direction of the arrow $f_5$, thus freeing all the rods 134 which could be depressed. The lower teeth 181 are also conformed and disposed so as to act on the fingers of the flaps 137, during the same displacement of the bar 178, and to tilt all the flaps 137 and simultaneously to push aside the levers 139 so that the fingers 139b of the latter come out of the way of the teeth 143 of the stop bars 125. When the bar 178 moves in the direction contrary to that of the arrow $f_5$ the teeth 180 lock the teeth 182 and prevent any movement of the flaps 136 and, accordingly, of the rods 134 of the keyboard.

The transverse movement of the toothed bar 178 is controlled through the medium of a push rod 183 connected with it by a screw 184 at one of its ends and the opposite end of which is linked on a lever 185 pivotally mounted on an axle 186 secured on a holder 187 rigidly connected with the cheek 2 (see Figures 4 and 22). On the other hand, the lever 185 is provided with a button hole 185a into which fits a pin 188 secured on a lever 189 keyed on a shaft 190 which is mounted in the bearing 187 and in similar bearings 191 and 192 also secured to the cheek 2, so as to be able to receive a movement of rotation about its axle and a longitudinal sliding movement. These various members are mounted so as to cause the locking bar 178 to slide in the corresponding direction by the amount which is exactly necessary for insuring the above mentioned locking operations, when the shaft 190 rotates in one direction or in the other under the action of a control which will be described later on.

At the rear end of the shaft 190 (Figure 4) is attached a spring 193 secured, on the other hand, to the frame and tending to carry it along longitudinally towards the rear of the machine. The shaft 190 is normally maintained against the action of this spring by a pin 194 secured on the stopping piece 58 on the stop bars 50 and against which it strikes through a ring 195 secured to it.

Moreover, the shaft 190 carries, at right angles with the driving shaft 70, a driving block 196 (see also Figure 27) provided with two pins 197—198 on which can act respectively, according to the longitudinal position occupied by the shaft 190, two slopes 199—200 fast with a sliding control lock 201 guided, on one hand, on the shaft 70 and, on the other hand, on a finger 202 secured to the cheek 2. The lock 201 carries a roller 203 which is maintained in engagement with a cam 204 keyed on the shaft 70 under the action of a spring 205 which constantly tends to return the lock 201 to its upper position. The profile of the cam 204 is such that, when the shaft 70 makes one turn, the said cam first causes the lock 201, by means of the roller 203, to move downwardly, thus causing through the medium of one or the other of the slopes 199 and 200 an angular movement of the shaft 190 in one direction or in the other. The return of the shaft 190 to its normal angular resting position is insured by a lever 226 pivotally mounted through an axle 227 on the holder 192 (see Figures 1, 4 and 5) and submitted to the action of a helical spring 228, this lever acting through the medium of a roller 229 on a lever 230 keyed at the rear end of the shaft 190.

Figure 28:
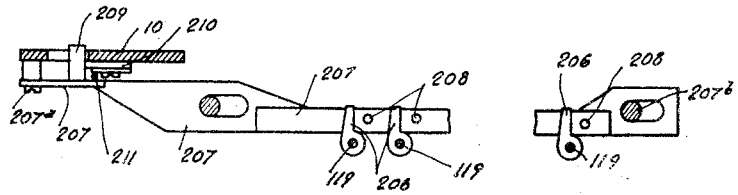
Figure 28 is a horizontal sectional view through XXVIII—XXVIII of Figure 27.

The shaft 190 also insures the control of the locking action of the releasing shafts 119 of the counting units through the medium of the following mechanism:

At the lower end of each of the releasing shafts 119 (see Figures 27 and 28) is secured a small stop lever 206 and below the lower frame members 10 is mounted—for each of the sections A1 and A2 of the machine—a bar 207 guided at its extremities on pins 207a so as to be able to move longitudinally. This bar carries pins 208 in a number corresponding to the number of the releasing shafts 119 and arranged so as to come respectively into engagement with the levers 206 during the longitudinal movement of the bar 207. At one of its extremities the bar 207 carries a roller 209 on which can act a cam 210 pivotally mounted on an axle 210a secured to the frame 10. This cam is connected by a link 211 with a lever 212 keyed on a shaft 213 which is journalled on a bearing 214 secured to the upper frame member 9b of the counting units. The shaft 214 carries a second lever 215 which is also keyed on the said shaft and at the free end of which is mounted a roller 216. With the roller 216 of the lever 215 corresponding to the section A2 of the machine cooperates an arm 217 provided on the driving block 196 of the shaft 190 so that when the said shaft has received no longitudinal movement out of its normal position shown in Figure 4 its rotation causes the arm 217 to come into engagement with the roller 216 and to produce an angular displacement of the levers 212—215 in the upward direction. This displacement determines through the medium of the link 211, of the cam 210 and of the roller 209, a sliding movement of the bar 207 in the direction of the arrow $f_6$ so that the pins 208 come into engagement with the stop levers 206 and lock the releasing shafts 119 which are thus prevented from any rotation even when the indentation 19 of a slide 16 comes to strike against their eccentric part 119a (Figure 7). A similar operation is obtained for the section A1 by the action of an arm 218 provided on the lever 230 secured to the rear end of the shaft 190 (see Figure 4) and which, when the said shaft has effected a certain longitudinal movement, comes to act, in the same conditions as the arm 217, on the roller 216 of the lever 215 corresponding to this section A1 (Figure 5).

For the control of its longitudinal movement, the shaft 190 carries towards its front end (Figures 4, 5 and 12) two stop rings 219—220 with which can come into engagement respectively two double pivoting levers 221 and 222, mounted on an axle 223 journalled in bearings 224 secured to the cheek 2, and the movements of which are controlled from the keyboard of the machine, as will be described later on. If one of the said levers is lowered and brought opposite the adjacent stop ring 219 or 220, it acts as a stop limiting in a corresponding manner the longitudinal movement of the shaft 190 under the action of the spring 193. The location of the stop rings 219 and 220 on the shaft 190 and the distance between the levers 221 and 222 with respect to the position of the arms 217 and 218 on the shaft 190 are such that when the lever 221 is lowered the shaft 190 is stopped in a position where the arm 218 alone acts on the roller 216 of the lever 215 corresponding to the section A1 of the machine, while if the lever 222 is lowered, the arm 217 alone acts on the roller 216 of the lever 215 corresponding to the section A2.

The control of the different operations which the machine has to perform is effected by the operator from the keyboard of the machine by means of a row of special keys 225 arranged so as to be parallel with the rows of keys 73 which control the operation of the different counting units (see Figure 1). In the example of execution which is shown and which relates to a machine comprising two counting sections A1 and A2, these functions are the following ones:

Addition,

Subtraction,

Non-addition in the counting units of the section A1,

Non-addition in the counting units of the section A1 and A2,

Non-addition in the counting units of the section A2,

Obtaining of a sub-total in counting units of the section A1,

Totalization or restoring to zero of a counting unit of the section A1,

Obtaining of a sub-total in counting units of the section A2,

Totalization or restoring to zero of a counting unit of the section A2.

Except for the addition, which forms the basic operation which can be normally effected by the machine a special key 225 is provided for each of these functions, which carries an indication coresponding to the function under consideration, that is, for instance (Figure 1):

S for the subtraction key,
NA₁ for the non-addition key for non-addition in counting units of section A₁,
NA for the non-addition key for non-addition in the sections A₁ and A₂,
NA₂ for the non-addition key for non-addition in section A₂,
ST₁ for the sub-total key in section A₁,
T₁ for the totalization key for totalizing in section A₁,
ST₂ for the sub-total key in section A₂,
T₂ for the totalization key in section A₂.

The keys 225 are arranged in a row parallel to the rows of keys 73 and 133 of the keyboards 72 and 132 and they are secured on vertical rods 231 mounted in a housing 75' (see Figure 2), identical to the housings 75 which have been described above the keyboard 72 and they are combined therein, also in an identical manner, with two tilting flaps which allow only one key at a time to be depressed. Below the row of rods 231 is provided a stop bar 50' identical to the stop bars 50 corresponding to the keyboard 72 and mounted with the latter ones in the holding frame 53. This stop bar 50' comprises two toothed blades identical to the blades 52a, 52b (Figures 10 and 11) of the bars 50 and with which co-operate in the already described manner the lower ends of the rods 231, the said stop bar 50' being urged towards the rear of the machine by a spring 57' fastened to the frame 53 and being maintained with the bars 50 in its normal position against the action of the said spring 57' by the stopping piece 58.

Each of the rods 231 carries a lateral arm 232. The arm 232 of the rod 231 fast with the subtraction key 225(S) is engaged in a fork 233a formed at the upper end of a link 233 the lower end of which is provided with a fork 233b through which it is guided on the adjacent brace 55a of the holder 55. The lower end of the link 233 (see Figures 2, 3, 5, 9 and 12) is connected with a lever 234 pivotally mounted on an axle 235 secured to the holder 55. On the lever 234 rests a lever 236 fast with a shaft 237 journalled on the holder 55 and on which is keyed a second lever 238. This lever is normally maintained by a spring 239 in a position in which it acts as a stop for an arresting peg 240 provided on the swinging frame 128 which carries the stop bars 125 corresponding to the keyboard 132. In this position the lever 238 holds the frame 128 fast against the action of a spring 241 called subtraction spring and secured to the frame 55 and which tends to draw to the left the frame 128 and, accordingly, all of the stop bars 125.

Under these conditions, when the key 225(S) is depressed the corresponding rod 231 drives the link 233 downwardly through the medium of its arm 232 and causes the lever 234 to be tilted as well as the levers 236 and 238 and frees the arresting peg 240. The frame 128 is then driven to the left by the spring 241 and it comes to occupy the position corresponding to subtraction and in which the toothed blades 127b and 127d of the stop bars 125 are located below the fingers 134e and 134f of the rods 134 pertaining to the keys 133 of the keyboard 132.

The frame 128 is returned to its normal position at the end of each cycle of the machine by a lever 242 pivotally mounted on a bolt 243 on the holder 55 and which acts on a roller 244 secured to the frame 128. This lever 242 is normally maintained in the position corresponding to the normal position of the frame 128 by a finger 245 secured on the stop bar 50'. When the stop bar 50', freed by the stopping piece 58, as described above for the bars 50, moves towards the rear of the machine under the action of its spring 57' the finger 245 frees the lever 242 which, on its side, frees the roller 244 and leaves the frame 128 under the influence of the spring 241. When the stopping piece 58 returns the stop bar 50' to its resting position, the finger 245 comes to rest against the lever 242 which, on its side, rests against the roller 244 secured to the frame 128 and pushes the latter to the right if it has been previously displaced to the left by the actuation of the key 225(S) or withdraws it from the arresting lever 238 if this actuation has not taken place.

Independently of this control by the key 225(S) the release of the frame 128 in view of its displacement to the left can, furthermore, be automatically controlled, in a particular circumstance which will be exposed later on, by a slope 102b provided on the driving bar 102 corresponding to the highest order of numeration (Figures 5, 16 and 17), this slope coming to act on a roller 238a mounted on the stopping lever 238 when the said bar 102 reaches the outmost advanced position which it can occupy. The lever 238 then releases the peg 240 and allows the lateral movement of the frame 128 under the action of the spring 241.

The arms 232 of the rods 231 corresponding to the keys 225(NA₁), 225(NA₂), 225(ST₁) and 225(ST₂) are engaged respectively in forks or button holes formed at the upper ends of vertical links 246 (Figure 2) the lower ends of which are linked on levers 247 keyed on shafts 248 journalled, on one hand, on the holder 55 and, on the other, in an auxiliary wall 249 secured to the braces 55a. On the shafts 248 are keyed, substantially at right angles with the levers 247 other levers 250 at the ends of which are connected respectively push rods 251 (see Figures 4 and 5). Both the rods 251 corresponding to the keys 225(NA₁) and 225(NA₂) are connected, respectively, at their ends opposite the levers 250, with two pawls 252 pivotally mounted, the first one on the upper frame member 9a of the counting unit of the section A₁ and the other on the frame member 9a of the counting unit of the section A₂. These pawls, which are called "non-addition pawls," are arranged so that when they are lowered, due to a movement of the rods 251 in the direction of the arrow f₇, their lower arm prevents any movement of the engaging bars 84 in which are provided oblique slots 84a which, as above explained, determine in each section the angular movement of the engaging column 25 about the axis of the shaft 28. As one may easily conceive, the lowering of the key 225(NA₁) causes the tilting of the pawl 252 of the section A₂, while the depression of the key 225(NA₂) causes the tilting of the pawl 252 of the section A₂.

Both the rods 251 corresponding to the keys 225(ST₁) and 225(ST₂) are connected in like manner with two pawls 253 pivotally mounted on the upper frame members 9a of the counters of each of the sections A₁ and A₂. These pawls, which are called "sub-total pawls," are arranged so that their lower arms stop the engaging bars 84 when the latter have been attracted by the action of the springs 91. For this purpose, the rods 251 which control the pawls are respectively connected with the corresponding levers 250 through button holes 251a in which are engaged fingers 254 fast with the said levers and springs 225 secured, on one hand, to the fingers 254 and, on the other, to the ends of the rods 251 under consideration, tend to draw the latter to the right. When, due to the lowering of one or the other of the keys 225(ST₁) and 225(ST₂), the corresponding lever 250 has been driven to the right, and when the engaging bar 84, also driven to the right by the spring 91, has released the pawl 253, the rod 251 driven by the spring 255 tilts the said pawl so that the bar 84 is no longer able to return to the left when the lever 89 will be returned later to its normal position. As it will be also seen from the foregoing description, the lowering of the key 225(ST₁) controls the tilting of the pawl 253 of the section A₁, while the depression of the key 225(ST₂) controls the tilting of the pawl 253 of the section (A₂).

The rod 231 of the key 225(NA) carries a stirrup 256 (see Figure 2) which, when the said rod is depressed, come to rest against two pins 246a fast with the links 246 corresponding to the keys 225(NA₁) and 225(NA₂), thus determining the simultaneous depression of these two links, which causes the tilting of both pawls 252 of both sections of the machine.

Figure 12:
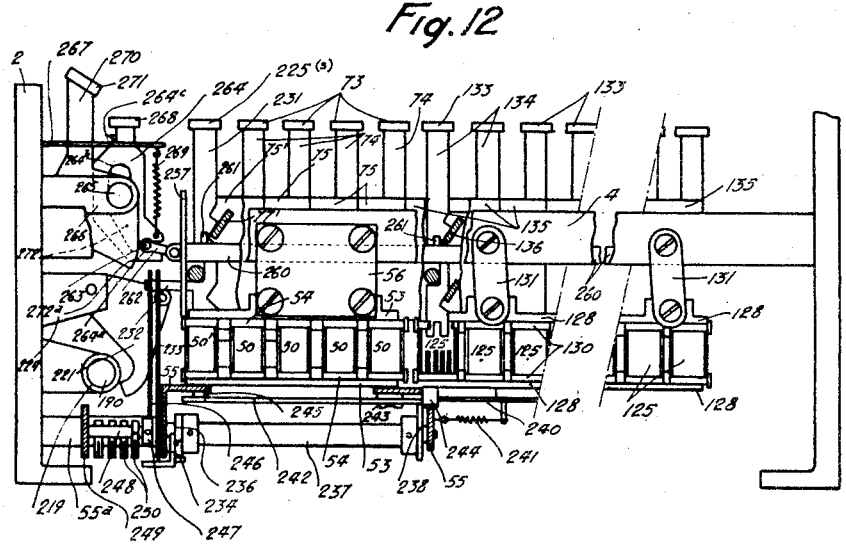
Figure 12 is a partial front view of the machine, the front cross-piece of the frame being supposed removed.

Finally, the arms 232 of the rods 231 corresponding to the keys 225(T₁), 225(T₂), 225(ST₁) and 225(ST₂) are arranged two by two flush with the above described double pivoting levers 221 and 222, so that the depression of any one of these four keys tilts one or the other of the levers 221 and 222 and brings them to the position in which they act as stops for the rings 219 and 220 of the shaft 190 (Figures 4 and 12).

The voluntary release of the different keys 72 and 133 and of the keys 225 which control the functions of the machine, either in view of the repetition of the operations for which the said keys have been depressed or for effecting corrections and the automatic release of the said keys at the end of each cycle of the machine are insured by the following mechanisms:

Transversely of the housings 75', 75 and 135 of the different rows of keys are mounted, in guides 257 fast with the said housings (Figures 2, 4 and 12), three bars 258, 259, 260 which can slide longitudinally in the said guides. These bars carry pins 261 adapted respectively for coming to rest, under the action of a movement of the said bars towards the right side of the machine, against the flaps 77', 77 and 136 of the housings 75', 75 and 135 in order to tilt the said flaps until the rods 231, 74 and 134, which could be depressed at this moment, are released. For this purpose, the bar 258 carries a single pin 261 which co-operates with the flap 77'; the bar 259 carries as many pins 261 as there are rows of keys 73 adapted for controlling the engagement of the different counting frames, that is to say four in the present example of execution, and which co-operate each with one of the flaps 77; the bar 260 carries as many pins 261 as there are rows of keys 133 corresponding to the sums to be recorded, that is to say fourteen in the present example, and which co-operate each with one of the flaps 136.

At the end of each of the bars 258, 259, 260, near the cheek 2 of the machine, is linked a small lever 262 which carries a finger 363 engaged in a notch 264a provided in the side of a plate 264 (see also Figures 1, 4 and 12). The three plates 264 corresponding to the three bars 258, 259, 260 are guided by a button-hole 264b on a shaft 265 journalled in a stirrup form bearing 266 secured to the cheek 2, and are engaged at their upper end in a casing 267 in which they are also guided by slots so that they can receive a vertical sliding movement and simultaneously a slight lateral displacement. A key 268 secured to their upper end allows them to be depressed downwardly at will, while a spring 269 secured to the casing 267 constantly tends to return them upwardly. An arresting tooth 264c of a suitable profile provided on each of the plates 264 fits below the casing 267 when the said plates are depressed and maintains them in the depressed position so long as the operator desires to repeat the operations for which the keys have been depressed. A slight lateral movement imparted to the key 268 of each plate 264 which has been depressed is sufficient for unhooking the tooth 264c and releasing the plate 264 which is returned upwardly by the spring 269.

On the shaft 265 are mounted, furthermore, so as to be able to swing freely, three levers 270 the lower parts of which lie opposite the fingers 263, irrespective of the position occupied by the repetition plates 264. The said levers carry respectively at their upper ends which project out of the casing 267—in which they are guided by suitable grooves—keys 271 which permit the operator to tilt them at will. During this movement the lever 270 which has been depressed determines, through the medium of the corresponding finger 263 and of the corresponding lever 262, a movement of the bar 258, 259 or 260 towards the right and, accordingly, the freeing of the keys of the keyboard under consideration by the bar which has been thus displaced, which gives the operator the possibility of correcting every erroneous action on the keys of any one of the three parts of the keyboard, independently of one another.

Finally, on the shaft 265 are keyed three levers 272 which are also arranged opposite the fingers 263 which control the displacement of the bars 258, 259 and 260, but the length of which is such that they can engage the fingers 263 with their lower part 272a, only when the repetition plates 264 are released upwardly, while they are withdrawn from these fingers when the plates 264 are lowered. The shaft 265 carries at one of its extremities a collar 273 with which co-operates one of the ends of a lever 274 pivotally mounted around a bolt 275 on the cheek 2 and the other end of which carries a roller 276 which receives the action of a cam 277 formed on the above described cam 204. The arrangement of these members is such that at the end of each revolution of the cam shaft 70, the cam 277 imparts to the lever 274 a tilting movement which determines, through the medium of the collar 273 an angular movement of the shaft 265 and of the three levers 272 which are fast with it. This movement causes, through the medium of the fingers 263 and of the bars 258, 259, 260, the automatic freeing of all the keys 225, 73 and 133 which could be depressed at this moment, except when the corresponding repetition key 268 is engaged by its tooth 264c.

Figure 15:
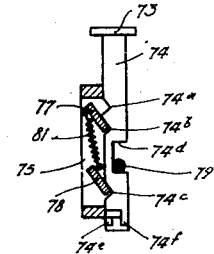
Figure 15 is a cross-sectional view of the same housing.

The angular movement of the collar 273 under the action of the cam 277 is used, furthermore, for insuring an automatic release of the pawls 253 when they are engaged with the corresponding bars 84 in order to make up for a possible insufficient return action of the spring 81 (Figure 15). For this purpose, a push rod 278 connected with the collar 273 is connected, on the other hand, with a bent lever 279 pivotally mounted on the frame member 9a of the section A₂ and the free arm of which is arranged so as to cooperate with pins 280 provided on the push rods 251 which control the pawls 253. When the rotation of the collar 273 causes, through the medium of the rod 278 such a pivotal movement of the lever 279 the latter exerts a lateral thrust on the pins 280 and thus releases the pawls 253.

Figure 10:
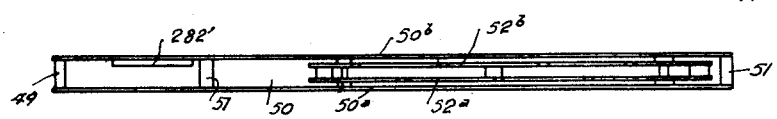
Figure 10 is a plan view of one of the stop bars controlling the engagement of the counting frames.
Figure 11:
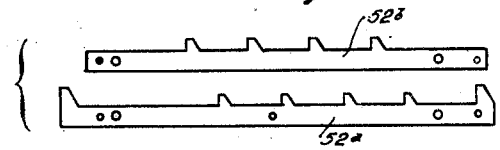
Figure 11 is a side view of the stops of this bar.

The recording of the sums introduced into the machine and of the results of the operations accomplished by the latter is effected by means of the following mechanism:

At the rear end of the plates 125a and 125b composing each stop bar 125 corresponding to the keyboard 132 (see Figures 20 and 21) are secured respectively two slopes 281 and 282 showing a stepped profile comprising a number of steps equal to the number of units, less one, of the base of numeration adopted (i. e. nine in the present case—Figure 16). The slope 281 secured to the left hand plate 125a is adapted for the recording of the operations of addition and its stepped profile is oriented towards the front of the machine. The slope 282 secured to the right hand plate 125b is adapted for the recording of the operations of subtraction and its stepped profile is oriented towards the rear of the machine. The stop bars 50 corresponding to the keyboard 72 and the stop bar 50' corresponding to the row of keys 225 carry at their rear end a single slope 282' arranged on their right side and similar to the slope 282 of the stop bars 125 (Figures 9–10).

Figure 30:
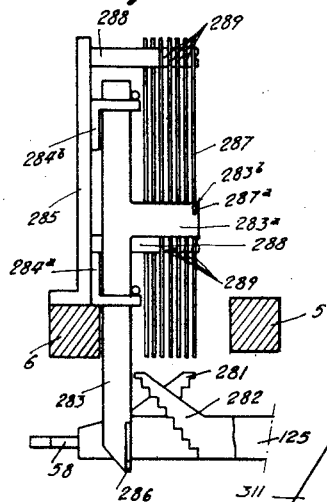
Figure 30 is a side view corresponding to Figure 29.

With the stepped slopes 281, 282 and 282' cooperate vertical blades 283 (Figures 29 and 30) which are mounted so as to be able to slide upwardly in guides 284a, 284b secured on a holder plate 285 fastened to the cross-piece 6 (see also Figure 2). The blades 23 corresponding to the stepped slopes 281 and 282 of the stop bars 125 possess at their lower part a double heel 286 so arranged that when all of the stop bars 125 are in the normal position the left side of this heel is in the plane of the corresponding addition slope 281 just below the lower step of the latter and that when, on the contrary, all of the stop bars 125 have been displaced towards the left to the position of the subtraction, the right side of the heel 286 is in the plane of the corresponding subtraction slope, just behind the highest step of this slope. The blades 283 corresponding to the slope 282' of the stop bars 50 and 50' possess a single heel 286' which is constantly disposed in the plane of these slopes.

Figure 31:
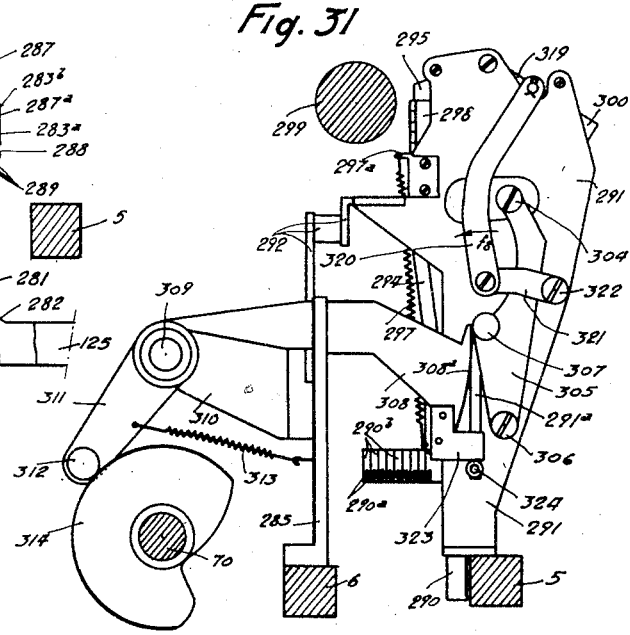
Figure 31 is a side view of the upper part of the recording mechanism showing the printing members.
Figure 32:
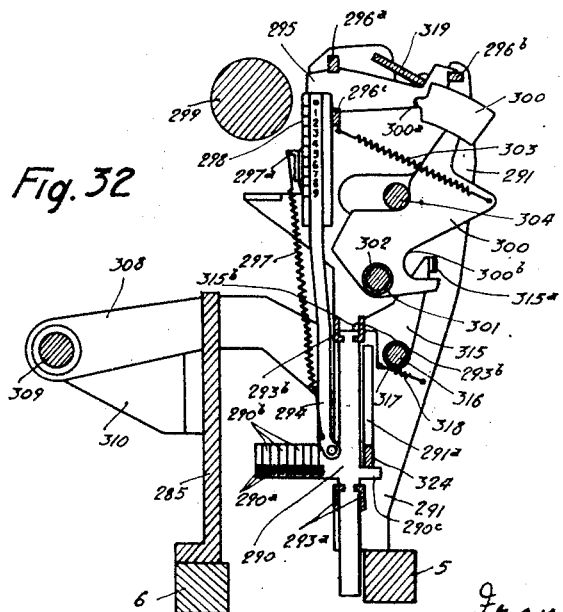
Figure 32 is a sectional view of the same part.
Figure 38:
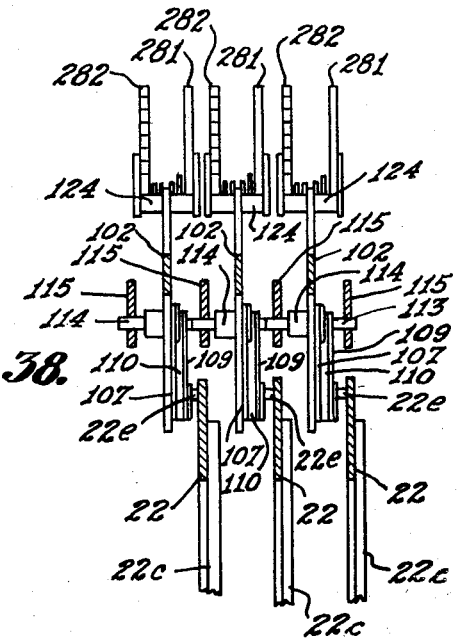
Figure 38 is a smaller sectional view taken on the line 38—38 of Figure 16.
Figure 37:
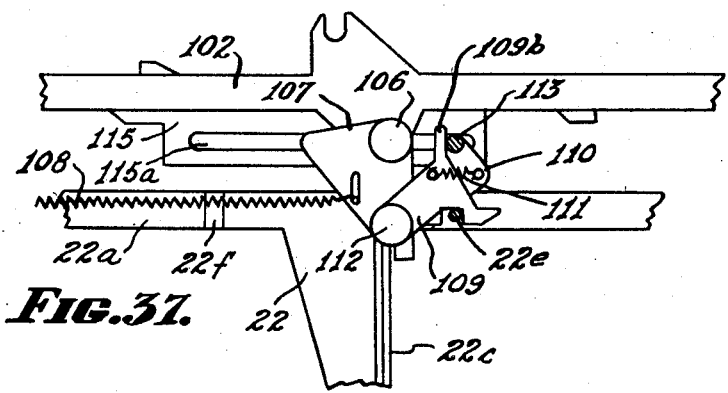
Figure 37 is a smaller sectional view taken on the line 37—37 of Figure 17.
Figure 36:
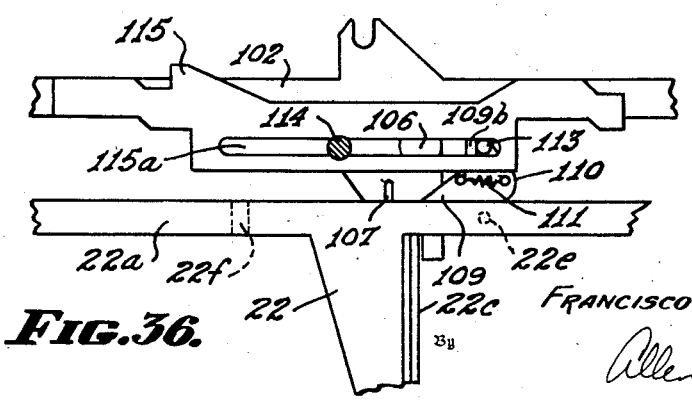
Figure 36 is an enlarged sectional view taken on the line 36—36 of Figure 17.

The blades 283 comprise an arm 283a projecting towards the front of the machine and the length of which decreases from a blade to the other, progressively and symetrically from the two blades 283 on the outmost right side and on the outmost left side of Figure 29 to the blade located in the middle part of this figure. The arm 283a of each blade is provided in the neighbourhood of its end with a groove 283b in which penetrates a stud 287a formed at the end of one of the lateral arms of a cross form connecting piece or reduction arm 287. The vertical parts of the connecting pieces 287 corresponding to the different blades 283 are grouped so as to be parallel with one another and provided with vertical grooves 287b through which they are guided so as to be able to slide upwardly on rods 288 secured on the holder plate 285, spacing washers 289 being inserted between each of the said pieces and the following one. The lateral arms of the pieces 287 which project, on both sides, towards the middle part of the machine, possess lengths which diminish progressively and symmetrically as may be seen from Figure 29 and they are provided at their ends with studs 287c which penetrate respectively into grooves 290a (see Figures 31 and 32) provided in the arms 290b of blades 290, the so-called "printing blades," the said arms being suitably arranged one above another. The said printing blades 290 are grouped so as to be parallel with one another between two cheeks 291 which are secured at their lower ends to the cross-piece 5 of the frame of the machine and connected at their upper ends by plates 292 with the holder plate 285; the printing blades 290 are guided so as to be able to slide vertically in guides 293a, 293b fastened at their ends to the cheeks 291. On each printing blade 290 is linked by its lower end a rod 294 the upper part of which is guided between plates 295 secured on cross-pieces 296a, 296b, 296c fastened at their ends to the cheeks 291. The rods 294 are held against the cross-piece 296c in a substantially vertical position by a tensioned spring 297 attached to a cross-piece 297a secured to the cheeks 291. At their upper part the rods 294 respectively carry a type bar 298 composed of figures corresponding to the units of the base of numeration and arranged along a vertical line in a downwardly increasing order and with an interal between them equal to the height of the slopes 281 or 282. The type bar 298 corresponding to the stop bar 50' in correlation with the keys 225 which control the functions of the machine carry, instead of figures, signs or indications corresponding to the functions under consideration. The type bars 298 are located opposite a printing roll 299 mounted in a known manner at the upper part of the frame of the machine (see also Figure 2); the arrangement of the types is such that the zero of each type bar 298 is located substantially on the level of the diametral horizontal plane of the roll 299 when the printing blades occupy the resting position shown in the Figures 31 and 32.

Opposite the different type rods 294 are mounted hammers 300, swinging about an axle 301 secured to the cheeks 291 and spaced one from another by spacing washers 302. Each hammer 300 is urged by a spring 303 attached to the crosspiece 296c and tending to displace it angularly towards the corresponding rod 294 so that its point 300a comes to strike against the top of the said rod. All the hammers are normally maintained in the resting position shown in the drawing by a stirrup formed of a rod 304 secured at its ends to two levers 305 pivotally mounted on the cheeks 291 by means of axles 306. The two levers 305 each carry a roller 307 and on each roller 307 rests the bent extremity 308a of a cam-lever 308 keyed on a shaft 309 journalled in bearings 310 secured to the holder plate 285. On the shaft 309 is keyed a lever 311 the free end of which carries a roller 312 with a spring 313 attached to the lever 311, on one hand, and to the holder plate 285, on the other, presses against the periphery of a cam 314 secured to the cam shaft 70. The arrangement of the elements is such that when the roller 312 comes near the small diameter part of the cam, the cam-levers 308 occupy a position in which they allow the movement of the levers 305 and of the stirrup 304 in the direction of the arrow $f_8$ (Figure 31), thus freeing all the hammers 300.

Each hammer 300 is provided with a notch 300b in which is normally engaged the bent extremity 315a of a holding pawl 315 pivotally mounted on an axle 316 secured to the cheeks 291. The different pawls are maintained suitably spaced from one another by spacing washers 317. Each of them is provided with a nose 315b which a spring 318 holds against the end of the corresponding printing blade 290. The bent extremity 315a of each pawl 315 is arranged in front of the bent extremity 315a of the pawl corresponding to the printing blade of the next higher order of numeration. The arrangement of the pawls 315 is such that when a printing blade 290 is moved upwardly by an amount at least equal to the height of a step of the slopes 281 or 282, the said blade rocks the corresponding pawl 315 so as to release its bent extremity 315a from the notch 300b of the corresponding hammer 300 and that the said pawl, in its turn, rocks the pawl corresponding to the next lower order of numeration and so on. Under these conditions all the pawls 315 of the orders of numeration below that of the pawl which has been rocked by the said printing blade are caused to rock, thus giving to the corresponding hammers 300 the possibility of striking as soon as the stirrup 304 will have been released by the play of the cam 314.

On the upper part of the cheeks 291 is pivotally mounted at its ends a releasing plate 319 which normally occupies a position in which it forms a stop for all the hammers 300, thus preventing the latter from striking even when the corresponding pawls 315 have been pushed aside and even when the stirrup 304 is released. This plate is connected by links 320 with two levers 321 pivotally mounted by means of axles 322 on the cheeks 291 and arranged so as to lie in the way of arms 323 attached to both cam-levers 308 when the latter reach the end of their upward stroke. The arms 323 then raise the levers 321 and, through the medium of the links 320, determine a pivotal movement of the releasing plate 319 which frees all the hammers 300 which are not retained by the pawls 315.

The arms 323 attached to the cam-levers 308 rest in the lower position of the latter on a stirrup 324 guided in vertical slots 291a provided in the cheeks 291 and resting itself on arms 290c fast with the printing blades 290 (Figure 32) so as to normally maintain the latter in the resting position.

As it may easily be conceived from the foregoing, when the cam shaft 70 makes one turn, the cam 314 offers to the roller 312 the hollow part of its profile and the spring 313 rocks the cam-levers 308 upwardly, this movement then leaving the stirrup 324 and the printing blades 290 free to move upwardly. However, the printing blades 290—the movement of which is checked by that of the blades 283 through the medium of the connecting pieces 287—can rise only up to the point where the heels 286 and 286' of the blades 283 are stopped by the steps of the stepped slopes 281 or 282 (according to the position occupied by the whole of the stop bars 125, 50 and 50'). Thus, the upward stroke of the printing blades 290 and, accordingly, of the type holders 294 and of the types 298 themselves depends on the movement effected by the stop bars towards the rear of the machine, this movement depending itself, as above explained, on the keys which have been depressed on the keyboard by the operator.

The shaft 70 pursuing its rotation, the cam-levers 308 continue their upward movement and, shortly before the end of this movement, they free the rollers 307. At this moment the levers 305 and the stirrup 304 rock, which partly frees the hammers 300 which are still maintained, however, by the plate 319. At the end of the upward movement of the cam-levers 308, the arms 323 of the latter raise the levers 321, the rods 320 and the plate 319 so that the hammers which have been released from the pawls 315 by the printing blades 290 are abandoned to the action of their springs 303 and strike against the corresponding type bars 298.

The shaft 70 still pursuing its rotation, the cam 314 engages the roller 312 anew with its larger diameter and the cam-levers 308 are returned downwards. Their arms 323 move the stirrup 324 downwardly and, due to this fact, the printing blades 290, the connecting pieces 287 and the blades 283 reassume their normal lower positions respectively. Simultaneously the bent part 308a of the cam-levers 308 rocks the levers 305, thus returning the stirrup 304 and, accordingly, the hammers 300, to their normal position, while the pawls 315 are also returned to their resting position by the springs 318. The releasing plate 319 reassumes, by gravity, together with the levers 321 and the rods 320, its stopping position opposite the hammers 300.

Figure 33:
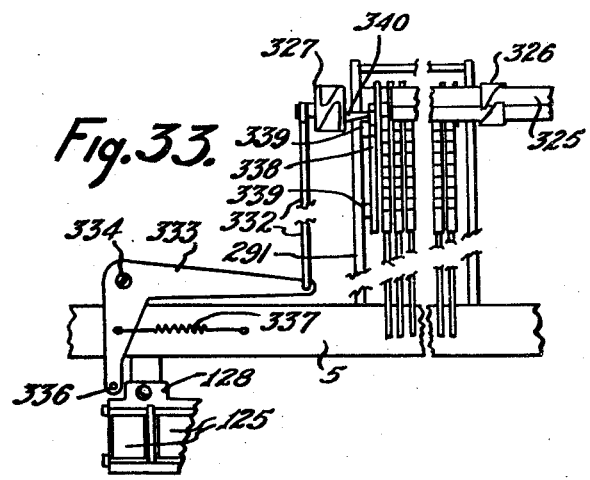
Figure 33 is a partial view from the rear of the mechanism controlling the displacements of the printing ribbon.

To allow the recording of sums in two different colors, more particularly when sums are to be added and others to be subtracted, the printing device comprises a two-color ribbon 325, between the printing roll 299 and the type bars 298 (see Figures 2 and 33). This ribbon is guided by guides 326 which are fast with two levers 327 keyed on a shaft 328 journalled in bearings 329 secured on one of the rails 330 of the printing carriage 331. One of the levers 327 is connected by a link 332 with one of the arms of a bent lever 333 pivotally mounted around an axle 334 on a holder 335 secured to the cross-piece 5. The other arm of the lever 333 carries a finger 336 which is held by a spring 337 against the lateral extremity of the right hand side of the frame 128 which carries the stop bars 125. On the right hand cheek 291 of the printing device is mounted a type bar 338 guided on the said cheek by two fingers 339 so as to be able to slide longitudinally. This type bar which carries, for instance, the sign + and the sign − arranged one above the other with an interval corresponding to the length of each of the colored bands of the ribbon 325 is connected, on the other hand, with a driving finger 340 fast with the adjacent ribbon guide 326. Under these conditions, when the frame 128 is displaced laterally towards the left in the already above described manner, the spring 337 rocks the lever 333 upwardly and the latter, through the medium of the link 332 and of the lever 327 connected to this link, raises the guides 326 and, accordingly, the ribbon 325 simultaneously with the type bars 338. Thus a printing is obtained which is in a different color from the normal color given by the ribbon 325 when the latter occupies its normal position and, furthermore, the type bar 338 insures the printing of the sign − opposite the recorded sum. On the contrary, when the frame 128 has not been displaced, the printing takes place in the normal color and the sign + is printed opposite the recorded sum.

Figure 34:
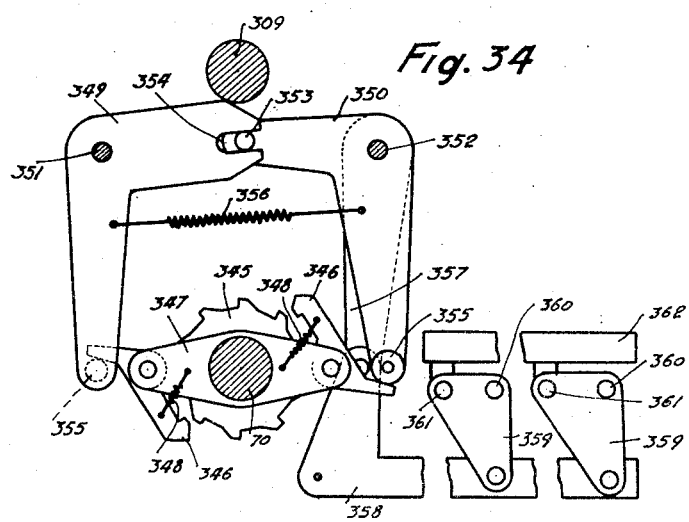
Figure 34 is a side elevational detail view of the mechanism controlling the coupling of the cam shaft with the motor of the machine.

Finally, the control of the clutching and declutching of the cam shaft 70 is effected by means of the following mechanism (Figures 1, 3 and 34):

Between the shaft 70 and the driving motor 71 is inserted a reduction gear 341, the primary shaft 342 of which is connected with the shaft of the motor 71 by a belt transmission 343. The secondary shaft 344 of the reduction gear 341 carries a ratchet wheel 345 engaged by two pawls 346 symmetrically mounted on a flange 347 secured to the adjacent extremity of the cam shaft 70, the said pawls being urged by return springs 348 which normally tend to engage them with the ratchet wheel 345. When the pawls 346 are thus engaged with the ratchet wheel 345 the shaft 70 is fast with the shaft 344 of the reduction gear 341 and it partakes of the movement of rotation of this latter, driven by the motor 71. On the holder 67 are pivotally mounted two bent levers 349, 350, the first one by an axle 351 secured on the said holder and the second by a shaft 352 on which it is secured and which is journalled between the said holder 67 and the right hand cheek 1 of the machine. Both these levers 349 and 350 respectively carry at the end of their arms adjacent to one another a pin 353 and a notch 354 engaged into one another. At the end of the other arms they respectively carry pins 355 arranged on the trajectories of the tails of the pawls 346. A spring 356 tensioned between the said arms tends to near them with respect to one another, this movement entailing a rocking movement of the pawls 346, thus releasing the latter from the ratchet wheel 345, and, accordingly, the declutching of the cam shaft 70 which then turns no longer.

On the shaft 352 which carries the lever 350 is secured a lever 357 at the lower end of which is linked a push rod 358 comprising a horizontal arm suspended to two similar levers 359 pivotally mounted on axles 360 secured to the cheek 1. On both these levers 359 is mounted, through axles 361, a control bar 362. The arrangement of these elements is such that when the bar 362 is lowered both levers 359 are rocked in a parallel direction and impart to the lever 357 through the rod 358 an angular displacement which determines the spacing of the bent levers 349 and 350 against the action of the springs 356. The pawls 346, which are freed by the pins 355, engage then the ratchet wheel 345 and the cam shaft 70 turns round. This rotation ceases as soon as the shaft 70 has turned exactly one revolution since, meanwhile, the spring 356 brings the levers 349 and 350 nearer to one another and the tails of the pawls, when returning to their starting position after one revolution of the ratchet wheel 345 strike again against the pins 355, thus determining the release of the pawls from the ratchet wheel and bringing the shaft 70 to a standstill.

The operation of the machine which has just been described is as follows, for the different operations for which the machine is provided:

I. *Addition.*—The operator depresses the keys 73 corresponding to the numbers of the counting units which must be actuated and then the keys 133 corresponding to the figures composing the sum to be added. The so depressed keys remain in their depressed position in which they are maintained by the flaps 77 and 136 of the housings 75 and 135 to which they pertain respectively, while the flaps 137 push aside the fingers 139b of the levers 139. All the fingers 139b corresponding to rows of keys in which no key has been depressed remain in their normal position, i. e. opposite the locking tooth 143 provided at the rear end of the blade 127a of the corresponding stop bars 125.

Then the operator depresses the control bar 362. The cam shaft 70 is then clutched on and it makes one complete revolution as above described. During this movement:

1. The cam 69 (Figure 9) drops the roller 68, the stopping piece 58 moves back and the stop bars 50 of the keyboard 72 of the counting units as well as the stop bar 50' move towards the rear of the machine, being attracted by their springs 57 and 57'. The finger 245 which is carried by the bar 50' (Figure 2) frees the lever 242 and the latter, in its turn, frees the roller 244, leaving the frame 128 under the influence of the spring 241. However, the frame 128 is not displaced towards the left since the lever 234 has not been rocked under the action of the subtraction rod 233 (for the key 225(S) has not been depressed) and, accordingly, the lever 238 remains opposite the stopping peg 240. On the other hand, the pin 194 of the stopping piece 58 frees the shaft 190 (Figure 4) and the latter is carried along axially by the springs 193 so that the pin 198 of the driving block 196 comes to lie flush with the slope 200 (Figure 4).

2. The cam 204 acts on the roller 203 (Figures 4 and 27) so as to move downward the sliding lock 201, thus bringing the slope 200 into engagement with the pin 198 and determining an angular movement of the shaft 190 about its axis. The pin 188 of the lever 189 keyed on the shaft 190 (see Figure 22)—the length of which pin is sufficient to be sure that it does not come out of the buttonhole 185a of the lever 185—rocks the lever 185 and this latter causes the locking bar 178 to slide in the reverse direction of the arrow $f_5$. All the rods 134 of the keys 133 are thus maintained in the position which has been given to them by the operator.

3. When continuing its return movement the stopping piece 58 leaves the stop bars 50, which are carried along by their springs 57, free to advance until they are checked by the rods 74 of the keys 73 which have been depressed by the operator. The bars 35 and 42 of the section A₂ are carried along during this movement by the axles 49 of the corresponding stop bars 50 (see Figure 9), while the bars 35 and 42 of the section A₁ are carried along through the medium of the auxiliary bars 43 and 44 and of the connecting plates 47 and 48 (Figure 5). Due to this fact, the engaging column 25 of each section of the machine is brought to the position corresponding to the setting made by the operator on the keyboard 72, that is to say that one of the fingers 31 of this column comes to lie opposite the nose 32 of the counting frame which must be set into action for the calculation to be effected.

4. The part of the cam 99 having the smallest diameter engages the roller 98 (Figure 4) and the lever 96 is rocked about its axle 97. The levers 89 are then attracted by the springs 91 and the rollers 88 push the bars 84 in the direction of the arrow $f_3$. The engagement columns 25 are angularly carried along about the shaft 28 and that of their finger 31 which lies opposite the nose 32 of a counting frame causes the triangle 14 and the slides 16 which form the said counting frame to slide horizontally in the direction of the arrow $f_1$ (Figure 7). The said slides 16 are simultaneously released from the vertical locking bars 20 which respectively correspond to them and they engage the vertical projecting edge 22c of the upright bars 22.

5. The part of the cam 158 having the smallest diameter (Figures 25 and 26) engages the roller 157, thus determining the yielding back of the stirrups 144 and 162, the first, 144, allowing an advancing movement of the driving bars 102, which are urged by their springs 104 (Figure 3) and the second, 162, allowing a possible movement of the horizontal arms 22a, 22b of the rules 22. The bars 102 carry along the stop bars 125 through the medium of the axles 124 until the rods 134 of the keys 133 which have been depressed by the operator check the said stop bars. Simultaneously, they carry along the arms 22a, 22b—and consequently the upright bars 22—through the medium of the pawls 109 (Figures 16 and 17). As the slides 16 of the counting frame which has been set into action engage the upright bars 22 which are thus carried along, the said slides are displaced longitudinally in their guides 15b by an amount corresponding to the figures of the keys 133 which have been depressed. The driving bars 102 corresponding to the stop bars 125 above which no key 133 has been depressed remain unmoved, the said stop bars being checked from the beginning by the fingers 139b of the levers 139 against which strike the locking teeth 143; the result is that the upright bars 22 corresponding to these driving bars and the slides 16 engaging them also remain unmoved.

It may happen that the amount by which the slides 16 advance, increased by their progression during a former operation, is higher than the number of units, less one, of the base of numeration adopted, i. e. higher than nine in the case of the decimal notation and consequently higher than the total length of the nine pitches of the said slides. In this case the carrying-over elements play their part in the following manner:

The notch 19 of each slide 16 the displacement of which is thus higher than the admissible limit strikes against the eccentric part 119a of the corresponding releasing shaft 119 (Figure 7) and the latter slightly swings with the stop 118 which is rigidly connected to it. This latter stop frees the corresponding carrying-over bar 115 (Figures 16 and 17), which rises under the action of its spring 117, thus raising the pin 113 corresponding to its order of numeration, as well as the pin 114 corresponding to the next higher order of numeration. At this moment, the pawl 109 rises and releases the finger 22e so that the arms 22a and 22b of the corresponding upright bar 22 are attracted by the spring 108 until the projection 22f comes to strike against the axle 112 of the pawl 109, this attraction being equal, as above mentioned, to the length of ten pitches of the slides 16. On the other hand, the pin 114 of the next higher order of numeration, having also been raised, causes the lever 107 of the same order of numeration to swing so that the pawl 109 on which this lever 107 is linked advances by an amount additional to that by which it should have advanced according to the position occupied by the rod 134 of the said order of numeration. The carrying-over bar 115 which has being caused to move to realise this operation is arranged so as to be able to rise only by such an amount that the said additional advance is exactly equal to the length of a pitch of the slide 16.

6. The hollow part of the profile of the cam 314 engages the roller 312 (Figures 31 and 32) and, due to this fact, the cam-levers 308 rise. The recording members are then operated in the already explained manner. The stop bars 50 and 125 have been advanced in the measure allowed to them by the keys 73 and 133 depressed by the operator; none of the stop bars 125 have received any lateral movement, so that the stepped slopes 281 corresponding to the addition now lie in the plane of the right hand part of the double heel 286 of the recording blades 283 (Figures 29 and 30); the arrangement of the steps of the slopes 281 is such that the upwards stroke—limited by them—of the printing members corresponds exactly to the position of the keys 133 the depression of which has determined the checking of the stop bars 125 in their longitudinal movement; in their turn, the stepped slopes 282' of the stop bars 50 lie above the heels 286' of the recording blades 283 which correspond to them in a position which is also determined by the depressed keys 73 and they control, therefore, the raising of the corresponding members. (It is to be noted here that the type bars 298 corresponding to the stop bars 50 could carry special signs other than figures, or in addition to figures, in order to identify the counting units which have been set into action by the depression of the keys 73.)

7. The cam 314 raises the roller 312 anew and, as already described, the printing members are returned to their resting position.

8. The part of the cam 99 having the larger diameter engages the roller 98 and the levers 93 are returned to their resting position through the bar 94; the same is true, therefore, for the bars 84 (under the action of the springs 87), so that the engaging columns 25 are pushed aside from the noses 31 of the counting frames and that that of the counting frames which had formerly been pushed to the position of engagement is returned to its position of rest under the action of the springs 21 (Figure 7). Furthermore, the return of the counting frames to the resting position is controlled by the rod 100, as already explained.

9. The projecting part of the profile of the cam 158 engages the roller 157 (Figures 25 and 26), which causes the return of the stirrups 144 and 162 to their normal position; all the driving bars 102 and all the rules 22 which have been moved, due to the operation which has been effectuated, are thus also returned to their resting position, as well as the corresponding stop bars 125. Simultaneously, the projecting part of the profile of the cam 177 engages the roller 176 and, through the medium of the rod 171, of the shafts 165 and 166 and of the stirrups 167 and 168, returns the carrying-over bars 115 which could have been displaced, to their normal position, i. e. behind the corresponding stops 118.

10. The cam 277 engages the roller 276 (Figures 4 and 12), determining the rocking of the shaft 265 and, through the medium of the three levers 272, of the fingers 263 and of the bars 258, 259 and 260, the freeing of all the keys 73 and 133 depressed by the operator, except when the operator has depressed one or more of the repetition keys 268. In this latter case, as explained above, the levers 272 corresponding to the keys 268 which have been depressed are without any action on the fingers 263 which correspond to them and the sums represented by the keys 73 and 133 which have been depressed remain set for the following operations until the keys 268 have been freed by the operator.

At the same time, the hollow part of the profile of the cam 204 engages the roller 203, the spring 205 attracts the lock 201 upwardly and, accordingly, the slope 200 frees the pin 198. The shaft 190 rocks into its normal position under the action of the spring 228 and the lever 189 which is rigidly connected with this shaft also returns the locking bar 178 (Figure 22) to its normal position, thus releasing the rods 134 of the keys 133, which are now free for a new operation.

11. The projecting part of the profile of the cam 69 engages the roller 68 (Figure 9) and the stopping piece 58 is returned to its normal position, thus pushing all the stop bars 50 and 50' for returning them to their position of rest. These bars carry with them the bars 35 and 42 which, in the already described manner, return the engaging columns 25 to their resting position in each section. At the end of this movement of the stopping piece 58, the finger 245 which is fast with the bar 50' (Figure 2) returns the lever 242 into engagement with the roller 244 secured to the frame 128 and the latter ceases to rest against the liver 238.

12. Finally, the shaft 190 is returned to its normal position by the pin 194 of the stopping piece 58 (Figure 4).

All the elements are then ready for a new operation.

II. *Subtraction.*—The operations to be realised are the same as for the addition with the following differences: In addition to the keys 73 corresponding to the number of the counting units which is to be set into action and of the keys 133 corresponding to the figures forming the sum to be subtracted, the operator depresses the key 225(S). Due to this fact, the push rod 233 (Figures 9 and 12) causes the lever 234 to rock, which, in its turn, causes the lever 236 to rock, the latter being rigidly connected to the lever 238. When the stopping piece 58 moves back under the action of the cam 69, as explained above, the finger 245 carried by the bar 50' (Figure 2) frees the lever 242 and the frame 128, with all the stop bars 125, is moved laterally towards the left under the action of the springs 241. The stop bars 125 are then checked in their longitudinal movements towards the rear of the machine by the teeth of their blades 127b and 127d coming to strike against the fingers 134e and 134f of the rods 134 corresponding to the depressed keys 133 (Figures 20, 21 and 24). The position of the teeth of the blades 127b and 127d is such that they check the stop bars 125, not when the latter have moved by a length proportional to the value of the corresponding depressed key, but by a length proportional to the different between the said value and a number of pitches of the slide 16 equal to the number of units less one of the base of numeration, i. e. nine in the decimal system. On the other hand, as all of the stop bars 125 have been shifted towards the left, the teeth 143 of the blades 127a of the said bars will not be opposite the fingers 139b of the levers 139 (Figures 21, 22 and 23). The stop bars 125 corresponding to the orders of numeration for which no key 133 has been depressed by the operator slide, therefore, freely until the teeth 143a come to strike against the projections 135b provided on the front part of the keyboard housings 135, the distance between each tooth 143a in the resting position and the corresponding projection 135b being equal, as explained above, to the length of nine pitches of the slide 16 (for the case of the decimal system). Under these conditions, the subtraction is effected by the addition of the complement, i. e. the difference between the sum to be subtracted and the maximum sum which can be set on the keyboard. The carrying-over slope 116, released due to the action of the shaft 119 adjoined to the highest order of numeration of the corresponding slope 115, raises the lever 123 and the pawl 120 under the above described conditions and causes the upright bar 22 corresponding to the lowest order of numeration to advance by a length corresponding to a pitch of the slide 16; accordingly, the slide 16 of the same order advances by a notch in addition to what the operator has set on the keyboard, which completes the subtraction by the addition of the complement.

The recording of the operation is effected in the direct direction by the stepped subtraction slopes 282 which are arranged in the reverse direction with respect to the addition slopes 281 so that the raising of the printing members is inversely proportional to the longitudinal movement of the stop bars 78.

III. *Totalization.*—For the totalization or resetting to zero of the counting units and for recording the totals, the operation is as follows. The operator sets on the keyboard 72 the number of the counting units in which the totalization must be effected and he depresses the key 225($T_1$) or 225($T_2$) according as this counting unit pertains to the section $A_1$ or to the section $A_2$ of the machine. Due to this depression, one of the levers 221 or 222 (Figures 4 and 12) is lowered and consequently lies in the position for which it acts as a stop for the ring 219 or for the ring 220 of the shaft 190. The operator then strikes against the control bar 362 and the machine realises its cycle under the same conditions as those which have been described for the addition except for the following differences:

During the return movement of the stopping piece 58, the shaft 190 is checked by that one of the levers 221 or 222 which has been lowered; the arm 217 or 218 carried by this shaft, according to the section under consideration, will thus be in such a position that it can engage the roller 216 of the lever 215 corresponding to this section (Figures 4, 5 and 27). The pin 197 remains in such a position that it can engage the slope 199. When the part of the cam 204 having the larger diameter engages the roller 203 and when the slope 199 is caused to move downward, the shaft 190 is, therefore, rocked in the direction opposite to that of the addition, thus determining the following operations:

(a) the locking bar 178 (Figure 22) is moved in the direction of the arrow $f_5$, thus causing, by its teeth 180 and 181, all the flaps 136 and 137 of the keyboard housings 135 to be tilted, which results in the fact that, on one hand, all the fingers 139b of the levers 139 are brought out of the way of the teeth 143 of the stop bars 125 and that on the other every key 133 which could have been depressed by mistake is freed.

(b) One of the arms 217 or 218 pushes the roller 216 of the lever 215 of the section $A_1$ or of the section $A_2$, and, accordingly, the corresponding elements 212, 213, 215 are caused to be tilted (Figures 27 and 28), while carrying with them the cam 210 through the medium of the connected push rod 211, and the bar 207 locks the stop levers 206 and the releasing shafts 119 on which the latter are secured.

When the small diameter part of the cam 158 engages the roller 157 and when the stirrup 144 is caused to move back, all the stop bars 125, the driving bars 102 and the slides 16 which have engaged the vertical projecting edges 22c of the upright bars 22 progress towards the rear of the machine under the action of the springs 104 (Figure 3), since neither the rods 134 of the keys 133 nor the fingers 139b can resist this advance. But when the notches 19 of the slides 16 come to strike against the eccentric parts 119a of the releasing shafts 119 the latter can not be rocked since they are locked by the bar 207. The slides 16, the rules 22, the bars 102 and, lastly, the stop bars 125, with their stepped slopes 281—282, are then stopped against the action of the springs 104. At this moment, the printing members are actuated as described above and they register a sum corresponding to the position of the steps 281—282, i. e. a sum which is proportional to the distance covered by the slides 16 which have been moved, from the position which they occupied at the beginning of the operation to their outmost position. When the cam 99 engages the roller 98 carried by the lever 96—which determines the already described movements for the levers 93 and 89—the slides 16 are released from the upright bars 22 and brought again into engagement with the locking bars 20; at this moment, they lie in their outmost advancing position, i. e. in the zero position.

As regards the registering effected by the printing members, it is advisable to consider two different cases according as the amount accumulated in the counter under consideration is in one way of the algebraical addition or in the other, i. e. according to the generally adopted terms, according as it is "positive" or "negative." An amount is positive when the values incorporated in addition in a counting unit are higher than the values incorporated in subtraction and it is negative in the opposite case.

A diagrammatical representation of the positive or negative position of the slides 16 of a counting unit is given in Figure 35 where it has been supposed that the number of slides of this counter is limited to eight.

The position A is the position occupied by the slides 16 of the counting unit under consideration after a totalization operation, i. e. when all the slides are in their outmost advancing position, after they have advanced by nine spacings with respect to the starting point zero. This position is the same as the position shown in Figure 7.

The position B corresponds to the same counting unit in which the sum 32,600 has been incorporated in addition; the driving bars have imparted to the slides $16_{(4)}$, $16_{(5)}$ and $16_{(6)}$, in the direction of the arrow, movements which are respectively proportional to the values 3, 2 and 6 in the corresponding orders of numeration. The indentations 19 of all the slides have released the shafts 119 which correspond to them and, accordingly, all these slides have moved back by ten spacings less one because of the carrying-over operations which have been realised as explained above. In short, they all are at the starting point except the slides $16_{(4)}$, $16_{(5)}$ and $16_{(6)}$ which remain advanced according to the values 3, 2 and 6 which have been incorporated.

The position C corresponds to the same counting unit in which an additional sum of 12,700 has been incorporated in addition. Only the indentation 19 of the slide $16_{(6)}$ for which the total of the freshly incorporated value and of the previously incorporated value exceeds 10 (6+7=13) has released the corresponding shaft 119; this slide has, therefore, moved back by ten, but it has immediately advanced by 7; its definitive position is thus 3. In its turn, the slide $16_{(5)}$ of the next higher order of numeration has advanced by 2+1 because of the carrying-over operation which has been realised; since its former position was 2, it occupies finally, therefore, the position 5. Finally, the slide $16_{(4)}$ which was in the position 3 has advanced by 1, thus occupying now the position 4. The other slides have not moved. The total positive sum accumulated in the counting units is thus 45,300.

The position D still corresponds to the same counting unit, but in which the sum 73,800 has been incorporated in subtraction. All the slides have advanced in the direction of the arrow, proportionally to the complements to 9 of the values incorporated in subtraction with each of the said slides, namely (counting from the slide 1 to the slide 8): 9, 9, 9, 2, 6, 1, 9, 9. Only the slide $16_{(5)}$ which was formerly in the position 5 and on which has been incorporated the value 6, has released with its indentation 19 the corresponding shaft 119; it has thus moved back by 10 from the position in which it lay and, immediately after, has advanced by 6, so that its definite position is 1. The slide $16_{(4)}$ which was in the position 4 has advanced by 2+1 carried over and, therefore, has come to occupy the position 7. The slide $16_{(6)}$ which was in the position 3 has advanced by 1, thus coming to the position 4. All the other slides have advanced by 9 and remain in the position 9.

When the operation to be realised is the totalization and the registering of the balance of a counting unit the slides 16 of which are in a negative position, i. e. in a position similar to the position shown at D in the example of Figure 35, the slide $16_{(1)}$ corresponding to the highest order of numeration is in the most advanced position, at 9 spacings from its starting point; now, after its engagement with the vertical edge 22c of the corresponding upright bar 22 (Figure 7) and when the stirrup 144 will allow the advancing movement of the bars 102, the bar 102 corresponding to this slide $16_{(1)}$ will be immediately stopped by its shaft 119 which is locked, as already explained. Under these conditions, the roller 238a of the lever 238 will not be engaged by the slope 102b which is provided on the said bar 102, none of the stop bars 125 will, therefore, be displaced towards the left and, accordingly, at the moment of the registering, the stepped slopes 281 will be above the left hand part of the heel 286 of the registering blades 285 (Figure 29). The stop bar 125 corresponding to the slide $16_{(1)}$ having received no advancing movement, its slope 281 will offer to the heel 286 its lowest step corresponding to zero, which results in the registering of the value 0 through the printing members. An identical registering operation takes place as regards the registering of the slides $16_{(2)}$, $16_{(3)}$, $16_{(7)}$ and $16_{(8)}$ which occupy the same position as the slide $16_{(1)}$. As to the slides $16_{(4)}$, $16_{(5)}$ and $16_{(6)}$, they perform, until the moment when they strike against the respectively corresponding shafts 119, strokes which are equal to the complements to 9 of the values represented by the positions occupied at D by the said slides, i. e. 2, 8 and 5. Since the corresponding slopes 281 present an increasing profile to the heels 256 of the registering blades, their steps corresponding to these values 2, 8 and 5, so that the printing members register the sum 28,500, i. e. the negative balance which is sought.

If the operation to be realised is the totalization and the registering of the balance of a counting frame, the slides 16 of which are in a positive position, i. e. in a position similar to that shown at C in Figure 35, the slide 16(1) corresponding to the highest order of numeration is not in the most advanced position which it can occupy and, accordingly, when it reaches this position during the totalization operation, the slope 102b of the driving bar 102 which corresponds to it will engage the roller 238a of the lever 238, thus causing the release of the stopping peg 240 as described above and allowing the lateral movement of all of the stop bars 125 towards the left. The registering operation will then be controlled by the stepped slopes 282. The slides 16(1), 16(2), 16(3), 16(7) and 16(8) which are in the zero position will cover a distance of 9 and as the slopes 282 have a decreasing profile, the value which has been registered for each of these slides will be zero. As to the slides 16(4), 16(5) and 16(6), they cover distances corresponding to the complements to 9 of the values represented by the positions which they occupy at C, i. e. 5, 4 and 6 respectively, so that the printing members register for these small rules the values 4, 5 and 3 forming the sum of 45,300 which corresponds to the positive balance which is sought.

As explained above, the driving bars 102 of each order of numeration in both sections of the machine are coupled together and thus fast with one another in their longitudinal movements. As only the releasing shafts 119 of one section of the machine have been locked in view of the totalisation, the registered totals are transferred to the other section of the machine.

It is first to be noted that the difference between an operation of totalization, as already described, and an operation of transfer, is only that at the moment of depressing the keys for the selection of the counting units which are to be totalized, another key should be depressed in order to select the totalizer belonging to the opposite section into which the transfer has to be made. When the driving bars 102 move to the rear of the machine as hereabove described, they drive, by means of the intermediate members 107, 109 and 22, two slides 16, one in the section where the totalization is being made and another in the opposite section. It is clear that the latter slide will move towards the rear of the machine exactly by the same number of pitches as the former slide has moved; that is, by the complement to nine of its position before it has been brought back to zero. It is obvious that the carrying-over operations, as described before, may be made in the section which is receiving the transfer.

IV. *Sub-total.*—After having set on the keyboard 72 the number of the counting units in which he wants to register a sub-total, the operator depresses one of the keys 225(ST1) or (ST2) according to the section of the machine in which the operation must take place. The spring 255 of the push rod 251 corresponding to the section under consideration (Figure 4) is stretched and when, in the course of the already described cycle, the corresponding engaging bar 84 slides towards the right, carried along by the spring 91, the push rod 251 is carried along by the spring 255 and causes the pawl 253 of the said section to be tilted. Due to this fact, when the lever 93 is returned to its normal position, the driving bar 84 can no longer follow it and the spring 87 is stretched. When the key 225(ST1) or (ST2) is freed, the pawl 253 rides and the bar 84 is returned to its normal position by the spring 87. In other words, the releasing movement of the slides 16 of the upright bars 22 has been delayed so that it only takes place after the return of the stirrup 144 instead of taking place before. Thus, the slides 16 do not remain in the zero position which they have reached when the registering took place, but, as they have remained in engagement with the upright bars 22, they return to their initial position, thus keeping the accumulated amount which has just been totalized.

V. *Non-addition.*—The operator depresses one of the keys 225(NA1) or 225(NA2), thus causing the pawl 252 of the corresponding section to be tilted. Under these conditions, during the release of the lever 89 by the lever 93, the lever 89 remains locked since the engaging bar 84 is checked by the pawl 252. If, instead of depressing the one or the other of the keys 225 (NA1) or 225(NA2) the operator had depressed the key (NA) both pawls 252 would have been simultaneously tilted and the engaging bars 84 of both sections of the machine would have been checked. In the first case, none of the counting frames of the section A1 or A2 and, in the second case, none of the counting frames of both sections will, therefore, be brought to a position of engagement with the slides and, accordingly, no sum will be incorporated in the section or sections under consideration.

What I claim is:

1. A calculating machine comprising a frame, a plurality of divisional frames in said frame, each divisional frame containing a plurality of horizontally superposed account frames each formed of two guide-bars and a cross bar uniting said guide bars; rack posts integral with said divisional frames and in which the guide-bars of the account frames comprised in the same divisional frame are slidably mounted in a horizontal direction; a number of slides in each account frame equal to the number of orders of numeration of the highest number which is to be recorded in each divisional frame of the machine, said slides being arranged perpendicularly to the guide-bars of the considered account-frame and their extremities being longitudinally guided on said guide-bars; calculating notches provided in one of the edges of each of said slides, in a number equal to that of units in the adopted basic numeration; a keyboard comprising groups of keys corresponding to the account frames, and groups of calculation keys; means for longitudinally locking said slides, mechanical means in relation with the keys of the keyboard corresponding to the account frames adapted to release said slides from their locking means; guides fast with the divisional frames of the machine; upright driving bars guided in said guides and adapted to engage the calculating notches of the slides in the account frames; slidable horizontal arms fast with said upright driving bars and extending over each divisional frame, driving bars parallel to said horizontal arms and each extending over all the divisional frames, ratchet members connecting said driving bars to said horizontal arms, springs pulling said driving bars longitudinally, a movable stirrup maintaining the said driving bars in their resting position, a rotatable cam controlling said stirrup and adapted to be connected to a driving mechanism, horizontally movable bars connected to the said driving bars and provided with stops cooperating with the keys of said keyboard, in such a manner that the longitudinal movements of said bars are a function of the numbers composed by means of said keys; and means in corelation with said slides for registering the data and results of the operations carried out by the machine.

2. A calculating machine comprising a frame, a plurality of divisional frames in said frame, each divisional frame containing a plurality of horizontally superposed account frames each formed of two guide-bars and a cross bar uniting said guide bars; rack posts integral with said divisional frames and in which the guide-bars of the account frames comprised in a same divisional frame are slidably mounted in a horizontal direction; a number of slides in each account frame equal to the number of orders of numeration of the highest number which is to be recorded in each divisional frame of the machine, said slides being arranged perpendicularly to the guidebars of the considered account frame and their extremities being longitudinally guided on said guide-bars; calculating notches provided in one of the edges of each of said slides, in a number equal to that of units in the adopted basic numeration; a keyboard comprising groups of keys corresponding to the account-frames, and groups of calculation keys; guides fast with the divisional frames of the machine; upright driving bars guided in said guides and adapted to engage the calculating notches of the slides in the account frames; fixed locking bars cooperating with the slides of the account frames; stop catches formed on the edge of said slides opposed to that provided with calculating notches, said stop catches being arranged to engage the said locking bars; springs connected to each account frame to carry said account frame horizontally in a direction perpendicular to the slides and to maintain it in a position where the said slides engage the said locking bars through their stop-catches; an engaging nose on the cross bar of each account frame; mechanical means adapted to be controlled by the keys corresponding to the account frames, and to engage said nose for moving each account frame against the action of said springs and bring it in a position where the slides are disengaged from their locking means and respectively engaged by means of their calculation notches with the upright driving bars; slidable horizontal arms fast with said upright driving bars and extending over each divisional frame, driving bars parallel to said horizontal arms and each extending over all the divisional frames, ratchet members connecting said driving bars to said horizontal arms, springs pulling said driving bars longitudinally, a movable stirrup maintaining the said driving bars in their resting position, a rotatable cam controlling said stirrup and adapted to be connected to a driving mechanism, horizontally movable bars connected to the said driving bars and provided with stops cooperating with the keys of said keyboard, in such a manner that the longitudinal movements of said bars are a function of the numbers composed by means of said keys, and means in corelation with said slides for registering the data and results of the operations carried out by the machine.

3. A calculating machine comprising a frame, a plurality of divisional frames in said frame, each divisional frame containing a plurality of horizontally superposed account frames each formed of two guide-bars and a cross bar uniting said guide-bars; rack posts integral with said divisional frames and in which the guide-bars of the account frames comprised in a same divisional frame are slidably mounted in a horizontal direction; a number of slides in each account frame equal to the number of orders of numeration of the highest number which is to be recorded in each divisional frame of the machine, said slides being arranged perpendicularly to the guide-bars of the considered account-frame and their extremities being longitudinally guided on said guide-bars; calculating notches provided in one of the edges of each of said slides, in a number equal to that of units in the adopted basic numeration; a key board comprising groups of keys corresponding to the account frames, and groups of calculation keys; guides fast with the divisional frames of the machine; upright driving bars guided in said guides and adapted to engage the calculating notches of the slides in the account frames; fixed locking bars cooperating with the slides of the account frames; stop catches formed on the edge of said slides opposed to that provided with calculating notches, said stop catches being arranged to engage the said locking bars; springs connected to each account frame to carry said account frames horizontally in a direction perpendicular to the slides and to maintain it in a position where the slides engage the said locking bars through their stop-catches; an engaging nose on the cross bar of each account frame; a column in each divisional frame of the machine provided with protruding pins arranged along a helical line and adapted to engage with the engaging noses of the account frames said column being adapted to receive a rotating motion about its axis, a translation motion along said axis and a translation motion perpendicular to said axis, for bringing one of said fingers opposite the engaging nose of a predetermined account frame and moving said account frame against the action of the spring connected thereto, thereby releasing the slides of said account frame from the corresponding locking bars and bringing said slides into engagement with the corresponding upright driving bars; means for controlling the motions of the said columns by means of the keys corresponding to the account frames; slidable horizontal arms fast with said upright driving bars and extending over each divisional frame, driving bars parallel to said horizontal arms and each extending over all the divisional frames, ratchet members connecting said driving bars to said horizontal arms, springs pulling said driving bars longitudinally, a movable stirrup maintaining the said driving bars in their resting position, a rotatable cam controlling said stirrup and adapted to be connected to a driving mechanism, horizontally movable bars connected to the said driving bars and provided with stops cooperating with the keys of said keyboard, in such a manner that the longitudinal movements of said bars are a function of the numbers composed by means of said keys; and means in corelation with said slides for registering the data and results of the operations carried out by the machine.

4. A calculating machine according to claim 3, comprising rotatable supports for each column, said columns being slidably mounted in said supports, a pin fast with one of said supports and engaging an oblique slot provided in a slidable bar carrying a projection adapted to engage a lever pivoted on the frame of the machine and controlled by a set of levers cooperating with a rotating cam driven by the driving mechanism of the machine, a gear wheel on each column, said gear wheel engaging a rack carried by a sliding bar, an annular groove in a pulley fast on each column, a pin carried by a pivoting lever and engaging said groove, said lever being connected to a sliding bar, each of the above mentioned sliding bars being connected to a slidably mounted abutment bar extending under the keyboard of the machine and provided with stops adapted to cooperate with the keys corresponding to the account frames, said abutment bar being connected to a return spring.

5. A calculating machine comprising a frame, a plurality of divisional frames in said frame, each divisional frame containing a plurality of horizontally superposed account frames each formed of two guide-bars and a cross bar uniting said guide bars; rack posts integral with said divisional frames and in which the guide-bars of the account frames comprised in a same divisional frame are slidably mounted in a horizontal direction; a number of slides in each account frame equal to the numbers of order of numeration of the highest number which is to be recorded in each divisional frame of the machine, said slides being arranged perpendicularly to the guide-bars of the considered account frame and their extremities being longitudinally guided on said guide-bars; calculating notches provided in one of the edges of each of said slides, in a number equal to that of units in the adopted basic numeration; a keyboard comprising groups of keys corresponding to the account frames, and groups of calculation keys; means for longitudinally locking said slides, mechanical means in relation with the keys of the keyboard corresponding to the account frames adapted to release said slides from their locking means; guides fast with the divisional frames of the machine; upright driving bars guided in said guides and adapted to engage the calculating notches of the slides of the account frames; slidable horizontal arms fast with said upright driving bars and extending over each divisional frame, horizontal driving bars parallel to said horizontal arms and each extending over all the divisional frames, right-angle levers pivoted on each of said horizontal driving bars, one above each of said divisional frames, springs connecting each of said levers to the corresponding horizontal arm and a connecting pawl pivoted on said lever and adapted to engage a pin carried by said corresponding horizontal arm, springs pulling said driving bars longitudinally, a movable stirrup maintaining the said driving bars in their resting position, a rotatable cam controlling said stirrup and adapted to be connected to a driving mechanism, horizontally movable bars connected to the said horizontal driving bars and provided with stops cooperating with the keys of said keyboard, in such a manner that the longitudinal movements of said bars are a function of the numbers composed by means of said keys; and means in corelation with said slides for registering the data and results of the operations carried out by the machine.

6. In a calculating machine according to claim 5, vertical shafts eccentrically journaled in each divisional frame and extending the whole height of the latter, in a number equal to that of the orders of numeration of the highest sum which is to be recorded by the machine, one of said shafts being placed beside each pile of slides in the account frames, said shafts being adapted to cooperate with a projection formed on each corresponding slide, a slidable, vertically disposed plate corresponding to each of said shafts and the lower edge of which forms slopes which rest on tranverse guides fast with the divisional frames of the machine, each of said plates being urged by a spring against an oscillating stop member fast with said eccentric shafts, a pin on each pawl-carrying right angled lever engaging a slot provided in the plate corresponding to the next inferior order of numeration, thereby being pivoted when the said plate is moved, the pawl carried by said lever being provided with a pin engaging a slot provided in the plate corresponding to the same order of numeration as said pawl, thereby being pivoted when the said plate is moved.

7. In a calculating machine according to claim 5, vertical shafts eccentrically journaled in each divisional frame and extending the whole height of the latter, in a number equal to that of the orders of numeration of the highest sum which is to be recorded by the machine, one of said shafts being placed beside each pile of slides in the account frames, said shafts being adapted to cooperate with a projection formed on each corresponding slide, a slidable, vertically disposed plate corresponding to each of said shafts and the lower edge of which forms slopes which rest on transverse guides fast with the divisional frames of the machine, each of said plates being urged by a spring against an oscillating stop member fast with said eccentric shafts, a pin on each pawl-carrying right angled lever engaging a slot provided in the plate corresponding to the next inferior order of numeration, thereby being pivoted when the said plate is moved, the pawl carried by said lever being provided with a pin engaging a slot provided in the plate corresponding to the same order of numeration as said pawl, thereby being pivoted when the said plate is moved, the plate corresponding to the lowest order of numeration being held against the action of its return spring by a releasable stop member fast with a rotating shaft carrying a lever controlled by a slope provided on the plate corresponding to the highest order of numeration.

8. In a calculating machine according to claim 1, a transversely shiftable carrying frame in which are slidably mounted the movable bars connected to the horizontal driving bars extending over the divisional frames, said movable bars being provided with two sets of stops extending in parallel rows along said bars and adapted to cooperate alternately with the keys of the keyboard of the machine when the said shiftable carrying frame is shifted to one side or the other, a spring maintaining said frame against an oscillating stop member controlled by a key of the keyboard, and a pivoting lever adapted to shift said frame against the action of said spring and controlled by bars cooperating with a cam connected to the driving mechanism of the machine.

9. In a calculating machine according to claim 1, a transversely shiftable carrying frame in which are slidably mounted the movable bars connected to the horizontal driving bars extending over the divisional frames, said movable bars being provided with two sets of stops extending in parallel rows along said bars and adapted to cooperate alternately with the keys of the keyboard of the machine when the said shiftable carrying frame is shifted to one side or the other, a spring maintaining said frame against an oscillating stop member controlled by a key of the keyboard and by a slope provided at the end of the horizontal driving bar corresponding to the highest order of numeration, and a pivoting lever adapted to shift said frame against the action of said spring and controlled by bars cooperating with a cam connected to the driving mechanism of the machine.

FRANCISCO CAMPOS.

REFERENCES CITED

The following references are of record in the file of this patent:

UNITED STATES PATENTS

| Number | Name | Date |
| --- | --- | --- |
| 895,664 | McFarland | Aug. 11, 1908 |
| 1,149,342 | Carroll | Aug. 10, 1915 |
| 1,318,799 | Quentell | Oct. 14, 1919 |
| 1,359,173 | Horton | Nov. 16, 1920 |
| 1,854,875 | White | Apr. 19, 1932 |
| 2,018,933 | Turck | Oct. 29, 1935 |
| 2,029,776 | Jacob | Feb. 4, 1936 |